US011812446B2

(12) United States Patent
Takeda et al.

(10) Patent No.: US 11,812,446 B2
(45) Date of Patent: Nov. 7, 2023

(54) FEEDBACK TECHNIQUES FOR MIXED MODE TRANSMISSION SCHEMES

(71) Applicant: QUALCOMM Incorporated, San Diego, CA (US)

(72) Inventors: Kazuki Takeda, Tokyo (JP); Le Liu, Fremont, CA (US); Alberto Rico Alvarino, San Diego, CA (US); Ayan Sengupta, San Diego, CA (US); Mostafa Khoshnevisan, San Diego, CA (US); Umesh Phuyal, San Diego, CA (US); Prasad Reddy Kadiri, San Diego, CA (US); Sitaramanjaneyulu Kanamarlapudi, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/212,943

(22) Filed: Mar. 25, 2021

(65) Prior Publication Data

US 2022/0312377 A1 Sep. 29, 2022

(51) Int. Cl.
*H04W 72/30* (2023.01)
*H04W 76/11* (2018.01)
(Continued)

(52) U.S. Cl.
CPC .......... *H04W 72/30* (2023.01); *H04W 24/08* (2013.01); *H04W 72/0466* (2013.01);
(Continued)

(58) Field of Classification Search
CPC . H04W 72/005; H04W 24/08; H04W 72/042; H04W 72/0466; H04W 72/14;
(Continued)

(56) References Cited

U.S. PATENT DOCUMENTS

| 2019/0215104 A1* | 7/2019 | Salem | H04W 80/02 |
| 2020/0008097 A1* | 1/2020 | Fujishiro | H04W 72/30 |

(Continued)

FOREIGN PATENT DOCUMENTS

| EP | 3051727 A1 * | 8/2016 | |
| WO | WO-2021007745 A1 * | 1/2021 | H04L 1/1812 |
| WO | WO-2021236055 A1 * | 11/2021 | |

OTHER PUBLICATIONS

International Search Report and Written Opinion—PCT/US2022/017927—ISA/EPO—dated May 11, 2022.

*Primary Examiner* — Shailendra Kumar
(74) *Attorney, Agent, or Firm* — Holland & Hart LLP

(57) ABSTRACT

Methods, systems, and devices for wireless communication are described to indicate a transmission scheme configuration for a message and whether the message is a retransmission or new transmission. In a first example, a base station may configure a subset of one or more feedback process identifiers (IDs) for multicast messages. In such cases, if a grant includes a feedback process ID associated with one of the reserved IDs, the message scheduled by the grant may be a retransmission of a multicast message. In a second example, feedback process IDs may be dynamically allocated to multicast or unicast messages via a corresponding grant. A message may be identified as a new transmission or retransmission of a unicast message or multicast message based on a combination of an ID associated with the grant and a new data indicator (NDI) of the grant.

30 Claims, 19 Drawing Sheets

(51) Int. Cl.
*H04W 76/27* (2018.01)
*H04W 24/08* (2009.01)
*H04W 72/044* (2023.01)
*H04W 72/23* (2023.01)

(52) U.S. Cl.
CPC ............ *H04W 72/23* (2023.01); *H04W 76/11* (2018.02); *H04W 76/27* (2018.02)

(58) Field of Classification Search
CPC ....... H04W 76/11; H04W 76/27; H04W 4/06; H04L 1/1887; H04L 1/1896; H04L 2001/0093; H04L 1/1822
See application file for complete search history.

(56) References Cited

U.S. PATENT DOCUMENTS

| | | |
|---|---|---|
| 2021/0028890 A1 | 1/2021 | Alvarino |
| 2021/0037500 A1 | 2/2021 | Liu et al. |
| 2021/0105101 A1* | 4/2021 | Wei ...................... H04L 1/1812 |
| 2023/0019024 A1* | 1/2023 | Stare ..................... H04W 72/30 |

* cited by examiner

FEEDBACK TECHNIQUES FOR MIXED MODE TRANSMISSION SCHEMES

FIELD OF TECHNOLOGY

The following relates to wireless communication, including feedback techniques for mixed mode transmission schemes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may support communications according to a point to point (PTP) transmission scheme and a point to multipoint (PTM) transmission scheme. In some cases, conventional PTP or PTM transmission schemes are deficient.

SUMMARY

The described techniques relate to improved methods, systems, devices, and apparatuses that support feedback techniques for mixed mode transmission schemes. Generally, the described techniques provide for indicating a transmission scheme configuration used to transmit or receive a data message and indicating whether the data message is a retransmission or a new transmission. In a first example, a base station may transmit semi-static signaling to configure a user equipment (UE) with a set of feedback process identifiers (IDs), where one or more of the feedback process IDs in the set have been reserved for multicast data messages. In such cases, if a grant (e.g., control message) includes a feedback process ID associated with one of the reserved IDs (e.g., via an indicated or preconfigured relationship) and is associated with a UE-specific radio network temporary identifier (RNTI), the data message scheduled by the grant may be a retransmission of a multicast data message and may use a point to point (PTP) transmission scheme configuration. If the grant includes a feedback process ID associated with one of the reserved IDs (e.g., via an indicated or preconfigured relationship) and is associated with a group-specific RNTI, the data message scheduled by the grant may be a new transmission of a multicast data message that uses a point to multipoint (PTM) transmission scheme configuration.

In a second example, feedback process IDs may be dynamically allocated to multicast and/or unicast data messages via the corresponding scheduling grant. For example, the UE may receive a first grant for a multicast data message associated with a first feedback process ID, and may receive a second grant for a second data message that also includes the first feedback process ID. The UE may identify whether the second data message is a new multicast data message, a multicast retransmission of a prior multicast data message, a unicast retransmission of a prior multicast data message, a new unicast data message, or a unicast retransmission of a unicast data message. For example, the UE may identify such characteristics based on a combination of a RNTI (e.g., group-common or UE-specific RNTI) associated with the second grant, a new data indicator (NDI) of the second grant, and in some cases, based on an additional field of the second grant. In some cases, if the UE receives a third grant associated with a group-common RNTI after receiving a grant associated with a UE-specific RNTI, the UE may identify a third data message scheduled by the third grant as a new multicast message transmitted using the PTM transmission scheme configuration and may monitor for the third data message accordingly.

A method for wireless communication at a user equipment (UE) is described. The method may include receiving control signaling indicating a set of multiple feedback process identifiers, where the set of multiple feedback process identifiers includes a first feedback process identifier reserved for multicast transmission, receiving a grant scheduling a retransmission of a multicast message and indicating a second feedback process identifier of the set of multiple feedback process identifiers, and monitoring for the retransmission of the multicast message in accordance with a point to point transmission scheme configuration or a point to multipoint transmission scheme configuration based on the second feedback process identifier.

An apparatus for wireless communication at a UE is described. The apparatus may include a processor, memory coupled with the processor, and instructions stored in the memory. The instructions may be executable by the processor to cause the apparatus to receive control signaling indicating a set of multiple feedback process identifiers, where the set of multiple feedback process identifiers includes a first feedback process identifier reserved for multicast transmission, receive a grant scheduling a retransmission of a multicast message and indicating a second feedback process identifier of the set of multiple feedback process identifiers, and monitor for the retransmission of the multicast message in accordance with a point to point transmission scheme configuration or a point to multipoint transmission scheme configuration based on the second feedback process identifier.

Another apparatus for wireless communication at a UE is described. The apparatus may include means for receiving control signaling indicating a set of multiple feedback process identifiers, where the set of multiple feedback process identifiers includes a first feedback process identifier reserved for multicast transmission, means for receiving a grant scheduling a retransmission of a multicast message and indicating a second feedback process identifier of the set of multiple feedback process identifiers, and means for monitoring for the retransmission of the multicast message in accordance with a point to point transmission scheme configuration or a point to multipoint transmission scheme configuration based on the second feedback process identifier.

A non-transitory computer-readable medium storing code for wireless communication at a UE is described. The code may include instructions executable by a processor to receive control signaling indicating a set of multiple feedback process identifiers, where the set of multiple feedback process identifiers includes a first feedback process identifier reserved for multicast transmission, receive a grant scheduling a retransmission of a multicast message and indicating a second feedback process identifier of the set of multiple feedback process identifiers, and monitor for the retransmission of the multicast message in accordance with a point to point transmission scheme configuration or a point to multipoint transmission scheme configuration based on the second feedback process identifier.

In some examples of the method, apparatuses, and non-transitory computer-readable medium described herein, the monitoring for the retransmission may include operations, features, means, or instructions for monitoring for the retransmission of the multicast message in accordance with the point to multipoint transmission scheme configuration based on the second feedback process identifier being the same as the first feedback process identifier.

In some examples of the method, apparatuses, and non-transitory computer-readable medium described herein, the monitoring for the retransmission may include operations, features, means, or instructions for monitoring for the retransmission of the multicast message in accordance with the point to point transmission scheme configuration based on the second feedback process identifier differing from the first feedback process identifier.

In some examples of the method, apparatuses, and non-transitory computer-readable medium described herein, the receiving the control signaling may include operations, features, means, or instructions for receiving radio resource control signaling indicating that the second feedback process identifier of the set of multiple feedback process identifiers may be useable for unicast transmission.

In some examples of the method, apparatuses, and non-transitory computer-readable medium described herein, the receiving the control signaling may include operations, features, means, or instructions for receiving radio resource control signaling indicating that the second feedback process identifier of the set of multiple feedback process identifiers may be useable for multicast transmission, unicast transmission, or both.

Some examples of the method, apparatuses, and non-transitory computer-readable medium described herein may further include operations, features, means, or instructions for receiving a second grant including the second feedback process identifier and scheduling transmission of a second multicast message, the second grant including a bit set scrambled with a group identifier and a new data indicator indicating that the second multicast message includes one of new data or previously transmitted data and monitoring for the second multicast message using the point to multipoint transmission scheme configuration based on the second grant including the bit set scrambled with the group identifier.

Some examples of the method, apparatuses, and non-transitory computer-readable medium described herein may further include operations, features, means, or instructions for receiving a second grant including the second feedback process identifier and scheduling transmission of a second message, the second grant including a bit set scrambled with a UE-specific identifier and a new data indicator indicating that the second message includes one of new data or previously transmitted data and monitoring for the second message using the point to point transmission scheme configuration based on the second grant including the bit set scrambled with the UE-specific identifier.

Some examples of the method, apparatuses, and non-transitory computer-readable medium described herein may further include operations, features, means, or instructions for receiving the second grant including a bit field and monitoring for the second message that may be a multicast retransmission based on the bit field.

Some examples of the method, apparatuses, and non-transitory computer-readable medium described herein may further include operations, features, means, or instructions for receiving the second grant including a bit field and monitoring for the second message that may be a unicast new transmission based on the new data indicator.

Some examples of the method, apparatuses, and non-transitory computer-readable medium described herein may further include operations, features, means, or instructions for receiving the second grant including a bit field and monitoring for the second message that may be a unicast retransmission based on the bit field.

A method for wireless communication at a UE is described. The method may include receiving a first grant scheduling transmission of a first multicast message in accordance with a point to multipoint transmission scheme configuration, the first grant indicating a first feedback process identifier for the first multicast message and including a first new data indicator having a first value, transmitting feedback for the first multicast message corresponding to the first feedback process identifier, receiving, based on transmitting the feedback, a second grant scheduling transmission of a second message and indicating the first feedback process identifier for the second message, the second grant including an indication of one of a UE-specific identifier or a group identifier and including a second new data indicator having a second value, and monitoring for the second message in accordance with a point to point transmission scheme configuration or point to multipoint transmission scheme configuration based on the indication and the second new data indicator.

An apparatus for wireless communication at a UE is described. The apparatus may include a processor, memory coupled with the processor, and instructions stored in the memory. The instructions may be executable by the processor to cause the apparatus to receive a first grant scheduling transmission of a first multicast message in accordance with a point to multipoint transmission scheme configuration, the first grant indicating a first feedback process identifier for the first multicast message and including a first new data indicator having a first value, transmit feedback for the first multicast message corresponding to the first feedback process identifier, receive, based on transmitting the feedback, a second grant scheduling transmission of a second message and indicating the first feedback process identifier for the second message, the second grant including an indication of one of a UE-specific identifier or a group identifier and including a second new data indicator having a second value, and monitor for the second message in accordance with a point to point transmission scheme configuration or point to multipoint transmission scheme configuration based on the indication and the second new data indicator.

Another apparatus for wireless communication at a UE is described. The apparatus may include means for receiving a first grant scheduling transmission of a first multicast message in accordance with a point to multipoint transmission scheme configuration, the first grant indicating a first feedback process identifier for the first multicast message and including a first new data indicator having a first value, means for transmitting feedback for the first multicast message corresponding to the first feedback process identifier, means for receiving, based on transmitting the feedback, a second grant scheduling transmission of a second message and indicating the first feedback process identifier for the second message, the second grant including an indication of one of a UE-specific identifier or a group identifier and including a second new data indicator having a second value, and means for monitoring for the second message in accordance with a point to point transmission scheme configuration or point to multipoint transmission scheme configuration based on the indication and the second new data indicator.

A non-transitory computer-readable medium storing code for wireless communication at a UE is described. The code may include instructions executable by a processor to receive a first grant scheduling transmission of a first multicast message in accordance with a point to multipoint transmission scheme configuration, the first grant indicating a first feedback process identifier for the first multicast message and including a first new data indicator having a first value, transmit feedback for the first multicast message corresponding to the first feedback process identifier, receive, based on transmitting the feedback, a second grant scheduling transmission of a second message and indicating the first feedback process identifier for the second message, the second grant including an indication of one of a UE-specific identifier or a group identifier and including a second new data indicator having a second value, and monitor for the second message in accordance with a point to point transmission scheme configuration or point to multipoint transmission scheme configuration based on the indication and the second new data indicator.

Some examples of the method, apparatuses, and non-transitory computer-readable medium described herein may further include operations, features, means, or instructions for receiving a third grant scheduling transmission of a third message and including a bit field scrambled by the group identifier and monitoring for the third message that may be a new transmission based on the second message being transmitted in accordance with the point to point transmission scheme configuration transmission scheme and the third grant including the bit field scrambled by the group identifier.

Some examples of the method, apparatuses, and non-transitory computer-readable medium described herein may further include operations, features, means, or instructions for receiving the second grant including a bit field scrambled by the UE-specific identifier and monitoring for the second message that may be a new transmission in accordance with the point to point transmission scheme configuration based on the bit field being scrambled with the UE-specific identifier and the second value being different than the first value.

Some examples of the method, apparatuses, and non-transitory computer-readable medium described herein may further include operations, features, means, or instructions for receiving a third grant scheduling transmission of a third message, the third grant including a bit field scrambled by the UE-specific identifier and a third new data indicator having the second value and monitoring for the third message that may be a retransmission of the second message in accordance with the point to point transmission scheme configuration based on the bit field being scrambled with the UE-specific identifier and the third new data indicator having the second value.

In some examples of the method, apparatuses, and non-transitory computer-readable medium described herein, and the method, apparatuses, and non-transitory computer-readable medium may include further operations, features, means, or instructions for monitoring for the third message that may be a retransmission of the second message based on the cast indicator bit field having a value indicating unicast.

Some examples of the method, apparatuses, and non-transitory computer-readable medium described herein may further include operations, features, means, or instructions for receiving the second grant including a bit field scrambled by the UE-specific identifier and monitoring for the second message that may be a retransmission of the first multicast message in accordance with the point to point transmission scheme configuration based on the bit field being scrambled with the UE-specific identifier and the second value being the same as the first value.

In some examples of the method, apparatuses, and non-transitory computer-readable medium described herein, and the method, apparatuses, and non-transitory computer-readable medium may include further operations, features, means, or instructions for monitoring for the second message that may be a retransmission of the first multicast message based on the cast indicator bit field having a value indicating multicast.

Some examples of the method, apparatuses, and non-transitory computer-readable medium described herein may further include operations, features, means, or instructions for receiving the second grant including a bit field scrambled by the group identifier and monitoring for the second message that may be a new transmission in accordance with the point to multipoint transmission scheme configuration based on the bit field being scrambled with the group identifier and the second value being different than the first value.

Some examples of the method, apparatuses, and non-transitory computer-readable medium described herein may further include operations, features, means, or instructions for receiving the second grant including a bit field scrambled by the group identifier and monitoring for the second message that may be a retransmission of the first multicast message in accordance with the point to multipoint transmission scheme configuration based on the bit field being scrambled with the group identifier and the second value being the same as the first value.

A method for wireless communication at a base station is described. The method may include transmitting, to a UE, control signaling indicating a set of multiple feedback process identifiers, where the set of multiple feedback process identifiers includes a first feedback process identifier reserved for multicast transmission, transmitting a grant scheduling a retransmission of a multicast message and indicating a second feedback process identifier of the set of multiple feedback process identifiers, and transmitting a retransmission of the multicast message in accordance with a point to point transmission scheme configuration or a point to multipoint transmission scheme configuration based on the second feedback process identifier.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a set of multiple feedback process identifiers, where the set of multiple feedback process identifiers includes a first feedback process identifier reserved for multicast transmission, transmit a grant scheduling a retransmission of a multicast message and indicating a second feedback process identifier of the set of multiple feedback process identifiers, and transmit a retransmission of the multicast message in accordance with a point to point transmission scheme configuration or a point to multipoint transmission scheme configuration based on the second feedback process identifier.

Another apparatus for wireless communication at a base station is described. The apparatus may include means for transmitting, to a UE, control signaling indicating a set of multiple feedback process identifiers, where the set of multiple feedback process identifiers includes a first feedback process identifier reserved for multicast transmission, means for transmitting a grant scheduling a retransmission of a multicast message and indicating a second feedback process identifier of the set of multiple feedback process identifiers, and means for transmitting a retransmission of the multicast message in accordance with a point to point transmission scheme configuration or a point to multipoint transmission scheme configuration based on the second feedback process identifier.

A non-transitory computer-readable medium storing code for wireless communication at a base station is described. The code may include instructions executable by a processor to transmit, to a UE, control signaling indicating a set of multiple feedback process identifiers, where the set of multiple feedback process identifiers includes a first feedback process identifier reserved for multicast transmission, transmit a grant scheduling a retransmission of a multicast message and indicating a second feedback process identifier of the set of multiple feedback process identifiers, and transmit a retransmission of the multicast message in accordance with a point to point transmission scheme configuration or a point to multipoint transmission scheme configuration based on the second feedback process identifier.

In some examples of the method, apparatuses, and non-transitory computer-readable medium described herein, the transmitting the retransmission of the multicast message may include operations, features, means, or instructions for transmitting the retransmission of the multicast message in accordance with the point to multipoint transmission scheme configuration based on the second feedback process identifier being the same as the first feedback process identifier.

In some examples of the method, apparatuses, and non-transitory computer-readable medium described herein, the transmitting the retransmission of the multicast message may include operations, features, means, or instructions for transmitting the retransmission of the multicast message in accordance with the point to point transmission scheme configuration based on the second feedback process identifier differing from the first feedback process identifier.

Some examples of the method, apparatuses, and non-transitory computer-readable medium described herein may further include operations, features, means, or instructions for transmitting a second grant including the second feedback process identifier and scheduling transmission of a second message, the second grant including a bit set scrambled with a UE-specific identifier, a new data indicator indicating that the second message includes previously transmitted data, and a bit field and transmitting the second message that may be a multicast retransmission based on the bit field.

Some examples of the method, apparatuses, and non-transitory computer-readable medium described herein may further include operations, features, means, or instructions for transmitting a second grant including the second feedback process identifier and scheduling transmission of a second message, the second grant including a bit set scrambled with a UE-specific identifier, a new data indicator indicating that the second message includes a new transmission, and a bit field and transmitting the second message that may be a new transmission based on the new data indicator.

Some examples of the method, apparatuses, and non-transitory computer-readable medium described herein may further include operations, features, means, or instructions for transmitting a second grant including the second feedback process identifier and scheduling transmission of a second message, the second grant including a bit set scrambled with a UE-specific identifier, a new data indicator indicating that the second message includes previously transmitted data, and a bit field and transmitting the second message that may be a unicast retransmission based on the bit field.

A method for wireless communication at a base station is described. The method may include transmitting, to a UE, a first grant scheduling transmission of a first multicast message in accordance with a point to multipoint transmission scheme configuration, the first grant indicating a first feedback process identifier for the first multicast message and including a first new data indicator having a first value, receiving feedback for the first multicast message corresponding to the first feedback process identifier, transmitting, based on receiving the feedback, a second grant scheduling transmission of a second message and indicating the first feedback process identifier for the second message, the second grant including an indication of one of a UE-specific identifier or a group identifier and including a second new data indicator having a second value, and transmitting the second message in accordance with a point to point transmission scheme configuration or point to multipoint transmission scheme configuration based on the indication and the second new data indicator.

An apparatus for wireless communication at a base station is described. The apparatus may include a processor, memory coupled with the processor, and instructions stored in the memory. The instructions may be executable by the processor to cause the apparatus to transmit, to a UE, a first grant scheduling transmission of a first multicast message in accordance with a point to multipoint transmission scheme configuration, the first grant indicating a first feedback process identifier for the first multicast message and including a first new data indicator having a first value, receive feedback for the first multicast message corresponding to the first feedback process identifier, transmit, based on receiving the feedback, a second grant scheduling transmission of a second message and indicating the first feedback process identifier for the second message, the second grant including an indication of one of a UE-specific identifier or a group identifier and including a second new data indicator having a second value, and transmit the second message in accordance with a point to point transmission scheme configuration or point to multipoint transmission scheme configuration based on the indication and the second new data indicator.

Another apparatus for wireless communication at a base station is described. The apparatus may include means for transmitting, to a UE, a first grant scheduling transmission of a first multicast message in accordance with a point to multipoint transmission scheme configuration, the first grant indicating a first feedback process identifier for the first multicast message and including a first new data indicator having a first value, means for receiving feedback for the first multicast message corresponding to the first feedback process identifier, means for transmitting, based on receiving the feedback, a second grant scheduling transmission of a second message and indicating the first feedback process identifier for the second message, the second grant including an indication of one of a UE-specific identifier or a group identifier and including a second new data indicator having a second value, and means for transmitting the second message in accordance with a point to point transmission scheme configuration or point to multipoint transmission scheme configuration based on the indication and the second new data indicator.

A non-transitory computer-readable medium storing code for wireless communication at a base station is described. The code may include instructions executable by a processor to transmit, to a UE, a first grant scheduling transmission of a first multicast message in accordance with a point to multipoint transmission scheme configuration, the first grant indicating a first feedback process identifier for the first multicast message and including a first new data indicator having a first value, receive feedback for the first multicast message corresponding to the first feedback process identifier, transmit, based on receiving the feedback, a second grant scheduling transmission of a second message and indicating the first feedback process identifier for the second message, the second grant including an indication of one of a UE-specific identifier or a group identifier and including a second new data indicator having a second value, and transmit the second message in accordance with a point to point transmission scheme configuration or point to multipoint transmission scheme configuration based on the indication and the second new data indicator.

Some examples of the method, apparatuses, and non-transitory computer-readable medium described herein may further include operations, features, means, or instructions for transmitting a third grant scheduling transmission of a third message and including a bit field scrambled by the group identifier and transmitting the third message that may be a new transmission based on the second message being transmitted in accordance with the point to point transmission scheme configuration transmission scheme and the third grant including the bit field scrambled by the group identifier.

Some examples of the method, apparatuses, and non-transitory computer-readable medium described herein may further include operations, features, means, or instructions for transmitting the second grant including a bit field scrambled by the UE-specific identifier and transmitting the second message that may be a new transmission in accordance with the point to point transmission scheme configuration based on the bit field being scrambled with the UE-specific identifier and the second value being different than the first value.

Some examples of the method, apparatuses, and non-transitory computer-readable medium described herein may further include operations, features, means, or instructions for transmitting a third grant scheduling transmission of a third message, the third grant including a bit field scrambled by the UE-specific identifier, a third new data indicator having the second value, and a cast indicator bit field and transmitting the third message that may be a retransmission of the second message in accordance with the point to point transmission scheme configuration based on the bit field being scrambled with the UE-specific identifier, the third new data indicator having the second value, and the cast indicator bit field having a value indicating unicast.

Some examples of the method, apparatuses, and non-transitory computer-readable medium described herein may further include operations, features, means, or instructions for transmitting the second grant including a bit field scrambled by the UE-specific identifier and a cast indicator bit field and transmitting the second message that may be a retransmission of the first multicast message in accordance with the point to point transmission scheme configuration based on the bit field being scrambled with the UE-specific identifier, the second value being the same as the first value, and the cast indicator bit field having a value indicating multicast.

DETAILED DESCRIPTION

Figure 1:
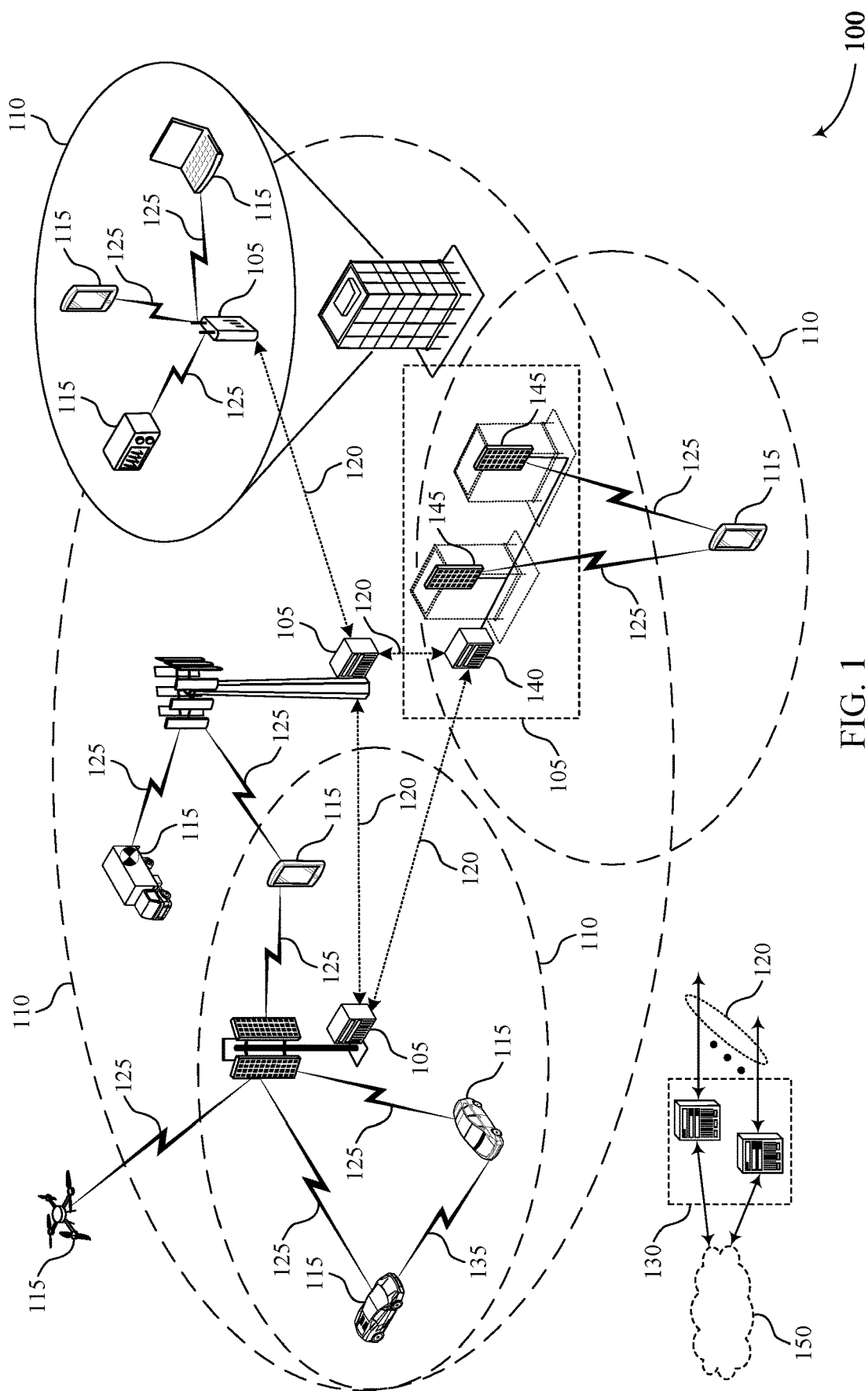
FIG. 1 illustrates an example of a wireless communications system in accordance with aspects of the present disclosure.

A base station may communicate with a group of multiple user equipments (UEs), where in some cases the communications with the group may be groupcast or multicast communications (e.g., communications addressed to the group of UEs). The group communications may take place according to a point to multipoint (PTM) transmission scheme configuration, in which a control message addressed to the group of UEs may be associated with a group-common radio network temporary identifier (RNTI). The group-common control message or grant may be transmitted by the base station, and may schedule a group-common, or multicast, data message. A UE of the group (e.g., among other UEs) may also communicate with the base station via a point to point (PTP) transmission scheme configuration, which the base station may use to transmit unicast transmissions to the UE. In the PTP transmission scheme configuration, the UE may monitor for a UE-specific control message or grant associated with a UE-specific RNTI. The UE-specific control message or grant may be transmitted by base station, and may schedule a UE-specific, or unicast, data message.

The UE may receive, from the base station, a control message scheduling a multicast data message that may be addressed to the group of UEs. The base station may transmit the multicast data message using a PTM transmission scheme configuration. In some cases, the UE may transmit a request for retransmission of the multicast data message, for example, based on monitoring for the multicast data message using the PTM transmission scheme configuration (e.g., based on failing to completely decode the multicast data message). If a relatively smaller number of UEs of the group request retransmission of the multicast data message (e.g., one or two UEs request retransmission), the base station may retransmit the data of the multicast data message using a PTP transmission scheme configuration to the respective UEs.

In some cases, it may be unclear which transmission scheme configuration (e.g., PTM or PTP) is used to transmit or receive a data message scheduled for retransmission. Additionally or alternatively, it may be unclear whether the data message is a new transmission or a retransmission of a prior multicast or unicast data message. Thus, the UE may not be aware of a transmission scheme configuration used to transmit or receive the data message, or whether to perform soft combining of the data message with another data message.

The present disclosure provides techniques to indicate a transmission scheme configuration used to transmit or receive a data message (e.g., one of a PTM or PTP transmission scheme configuration) and to indicate whether the data message is a retransmission or a new transmission. In a first example, the base station may transmit semi-static signaling to configure the UE with a set of feedback process IDs, where one or more of the feedback process IDs in the set have been reserved for multicast data messages. Reserved may refer to a UE getting a higher-layer configuration or applying a predetermined rule that indicates one or multiple feedback process IDs are to be used for multicast. In such cases, if a grant (e.g., control message) includes a feedback process ID associated with one of the reserved IDs (e.g., via an indicated or preconfigured relationship) and is associated with a UE-specific RNTI, the data message scheduled by the grant may be a retransmission of a multicast data message and may use a PTP transmission scheme configuration. If the grant includes the same feedback process ID as the original multicast data message, and if the data message uses a PTM transmission scheme configuration, the data message scheduled by the grant may be a retransmission of the multicast data message.

In a second example, feedback process IDs may be dynamically allocated to multicast and/or unicast data messages via the corresponding scheduling grant. For example, the UE may receive a first grant for a multicast data message associated with a first feedback process ID, and may receive a second grant for a second data message that also includes the first feedback process ID. The UE may identify whether the second data message is a new multicast data message, a multicast retransmission of a prior multicast data message, a unicast retransmission of a prior multicast data message, a new unicast data message, or a unicast retransmission of a unicast data message. For example, the UE may identify such characteristics based on a combination of a RNTI (e.g., group-common or UE-specific RNTI) associated with the second grant, an NDI of the second grant, and in some cases, based on an additional field of the second grant.

In some cases, if the UE receives a third grant associated with a group-common RNTI after receiving a grant associated with a UE-specific RNTI, the UE may identify a third data message scheduled by the third grant as a new multicast message transmitted using the PTM transmission scheme configuration and may monitor for the third data message accordingly.

Aspects of the disclosure are initially described in the context of wireless communications systems. Aspects of the disclosure are further illustrated by and described with reference to feedback schemes, transmission scheduling schemes, process flows, apparatus diagrams, system diagrams, and flowcharts that relate to feedback techniques for mixed mode transmission schemes.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may indicate a transmission scheme configuration used to transmit or receive a data message (e.g., one of a PTM or PTP transmission scheme configuration) and may indicate whether the data message is a retransmission or a new transmission. In a first example, the base station 105 may transmit semi-static signaling to configure a UE 115 with a set of feedback process IDs, where one or more of the feedback process IDs in the set have been reserved for multicast data messages. In such cases, if a grant (e.g., control message) includes a feedback process ID associated with one of the reserved IDs (e.g., via an indicated or preconfigured relationship) and is associated with a UE-specific RNTI, the data message scheduled by the grant may be a retransmission of a multicast data message and may use a PTP transmission scheme configuration.

In a second example, feedback process IDs may be dynamically allocated to multicast and/or unicast data messages via the corresponding scheduling grant. For example, the UE 115 may receive a first grant for a multicast data message associated with a first feedback process ID, and may receive a second grant for a second data message that also includes the first feedback process ID. The UE 115 may identify whether the second data message is a new multicast data message, a multicast retransmission of a prior multicast data message, a unicast retransmission of a prior multicast data message, a new unicast data message, or a unicast retransmission of a unicast data message. For example, the UE 115 may identify such characteristics based on a combination of a RNTI (e.g., group-common or UE-specific RNTI) associated with the second grant, an NDI of the second grant, and in some cases, based on an additional field of the second grant.

Figure 2A:
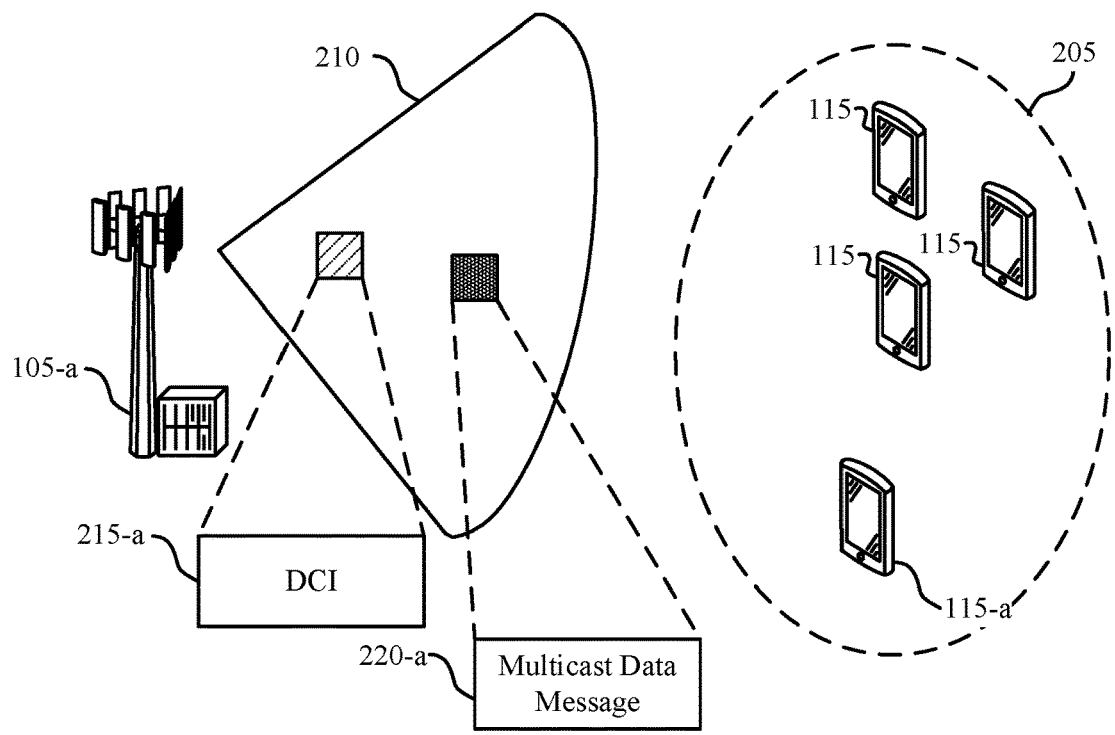
FIGS. 2A and 2B illustrate examples of wireless communications systems in accordance with aspects of the present disclosure.
Figure 2B:
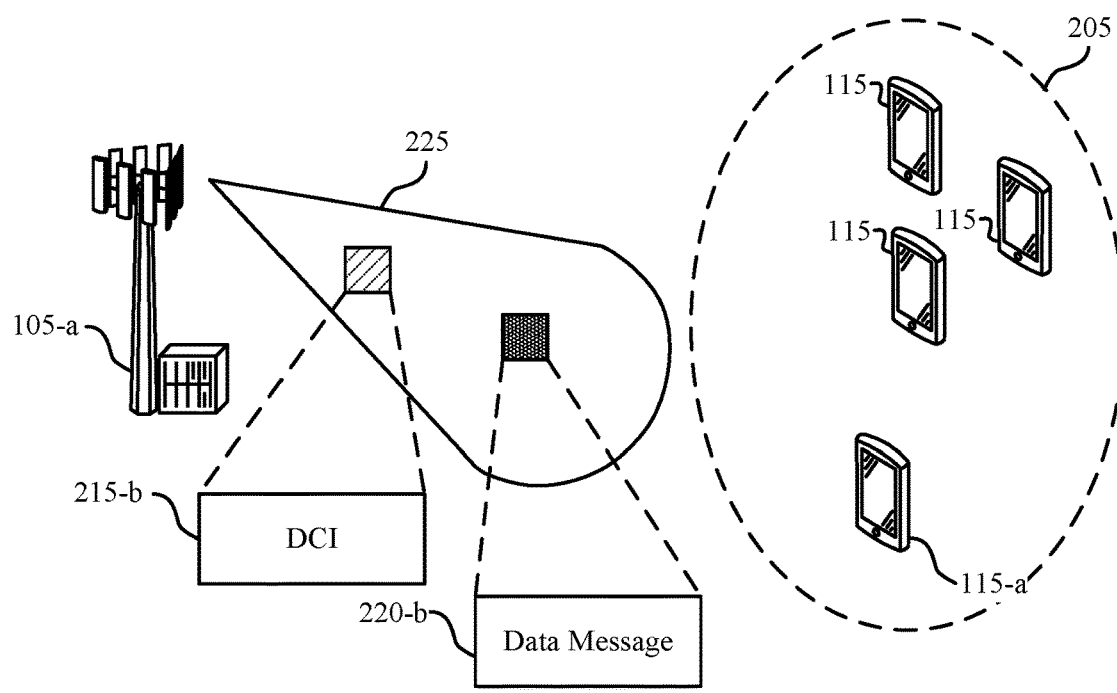

FIGS. 2A and 2B illustrate examples of wireless communications systems 200 and 201 that support feedback techniques for mixed mode transmission schemes in accordance with aspects of the present disclosure. Wireless communications systems 200 and 201 may include a base station 105-a, which may communicate with multiple UEs 115, where the UEs 115 and base station 105-a may represent examples of UEs 115 and a base station 105 described with reference to FIG. 1. Base station 105-a may communicate with a group of multiple UEs 115 (e.g., a group 205), where in some cases the communications may be groupcast or multicast communications (e.g., communications addressed to the group 205 of UEs 115). The group 205 may represent a group of UEs 115 associated with a same group identifier (e.g., a group common, or group, RNTI), such as UEs 115 in a same multicast/broadcast services (MBS) group.

The group communications may take place according to a PTM transmission scheme configuration 210, which may be illustrated by FIG. 2A. In a first PTM transmission scheme configuration 210, UEs 115 in the group 205 that are in an RRC connected state may monitor for a group-common control message or grant (e.g., a group-common physical downlink control channel (PDCCH) or downlink control information (DCI) 215) with a cyclic redundancy check (CRC) scrambled by a group-common RNTI. The group-common control message or grant may be transmitted by base station 105-a, and may schedule a group-common, or multicast, data message 220 (e.g., a physical downlink shared channel (PDSCH)) scrambled by the group-common RNTI. In some cases, this transmission scheme configuration may be referred to as group-common PDCCH based group scheduling.

In a second PTM transmission scheme configuration 210, UEs 115 in the group 205 may monitor for a UE-specific control message or grant (e.g., a UE-specific PDCCH or DCI 215) with a CRC scrambled by a UE-specific RNTI (e.g., a cellular RNTI (C-RNTI)). In some examples, the UE may or might not be in an RRC connected state. The UE-specific control message or grant may be transmitted by base station 105-a, and may schedule a group-common, or multicast, data message 220 (e.g., a PDSCH) scrambled by a group-common RNTI. In some cases, this transmission scheme configuration may be referred to as UE-specific PDCCH based group scheduling A UE 115 of the group 205 (e.g., among other UEs 115) may also communicate with base station 105-*a* via a PTP transmission scheme configuration 225, which base station 105-*a* may use to transmit unicast transmissions to the UE 115. In the PTP transmission scheme configuration 225, UEs 115 that are in an RRC connected state may monitor for a UE-specific control message or grant (e.g., a UE-specific PDCCH or DCI 215) with a CRC scrambled by a UE-specific RNTI (e.g., a C-RNTI). The UE-specific control message or grant may be transmitted by base station 105-*a*, and may schedule a UE-specific, or unicast, data message 220 (e.g., a PDSCH) scrambled by the UE-specific RNTI.

As described herein, a group-common control message (e.g., group common DCI 215) or group-common data message may refer to a message that is transmitted using same time and frequency resources, and that may be identified by each UE 115 of the group 205. A UE-specific control message (e.g., UE-specific DCI 215) or UE-specific data message 220 may refer to a message that may be identified by a target UE (e.g., based on the corresponding C-RNTI), but may not be identified by the other UEs 115 of the group 205.

As described herein, a PTP transmission scheme configuration 225 and a PTM transmission scheme configuration 210 may be associated with one or more respective communication parameters, which may vary depending on the configuration. For example, the PTP transmission scheme configuration 225 and the PTM transmission scheme configuration 210 may each be associated with a respective transmission configuration indicator (TCI) state, a resource allocation, a modulation coding scheme (MCS), a precoding matrix indicator (PMI), or any combination thereof. The UE(s) 115 and base station 105-*a* may use the respective parameter(s) of the PTP or PTM transmission scheme configuration to transmit or receive a respective PTP or PTM communication.

By knowing which transmission scheme configuration is used to transmit a message, a UE 115 may use the parameter(s) of the respective transmission scheme configuration to receive the message and generate soft bits indicative of the data transmitted via the message. The soft bits may be independent of the transmission scheme configuration used to transmit the message, such that the UE may soft combine the same message (e.g., data from the same message) when transmitted using different transmission schemes. In this way, data generated from a PTP transmission scheme configuration may be similar to data generated from a PTM transmission scheme configuration, and the data transmitted and received using the different configurations may be combined by the UE 115.

In a first example illustrated by FIG. 2A, a UE (e.g., a UE 115-*a*) may receive, from base station 105-*a*, a DCI 215-*a* scheduling a multicast data message 220-*a* that may be addressed to the group 205 of UEs 115. Base station 105-*a* may transmit the multicast data message 220-*a* using a PTM transmission scheme configuration 210, such that the transmission of the multicast data message 220-*a* may be associated with one or more PTM parameters for transmission and/or reception. In some cases, one or up to all of the UEs, such as UE 115-*a*, monitoring for the same multicast data message 220-*a* transmitted using the PTM scheme configuration may be unable to decode the multicast data message 220-*a* and may transmit a request for retransmission of the multicast data message 220-*a* (e.g., via HARQ feedback), for example, based on monitoring for the multicast data message 220-*a* using the PTM transmission scheme configuration (e.g., based on failing to completely decode the multicast data message 220-*a*).

In some cases, when a relatively smaller number of UEs 115 of the group 205 request retransmission of the multicast data message 220-*a* (e.g., one or two UEs 115, such as UE 115-*a*, request retransmission), base station 105-*a* may beneficially have the option to select which transmission scheme configuration is used for retransmission. For example, the base station 105-*a* may opt to send the retransmission of the multicast data message 220-*a* using a PTM transmission scheme configuration, in which case the benefit may be that the base station 105-*a* does not have to retransmit the multicast data message 220-*a* one by one to each UE when a large number of UEs failed to decode the prior transmission of the multicast data message 220-*a*. In another example, the base station 105-*a* may opt to send the retransmission of the multicast data message 220-*a* using a PTP transmission scheme configuration, in which case the benefit may be that the base station 105-*a* may use one or more UE-specific parameters for re-transmission of the multicast data message 220-*a* that may account for current radio-link conditions to enhance the likelihood successful UE reception of the retransmission.

In some cases, the base station 105-*a* may retransmit the data of the multicast data message 220-*a* using a PTP transmission scheme configuration 225 to the respective UEs 115. For example, if UE 115-*a* is in an RRC connected state, if HARQ feedback is supported for the first PTM transmission scheme configuration 210, and if the initial multicast data message 220-*a* was based on the first PTM transmission scheme configuration 210, base station 105-*a* may support retransmission of multicast data message 220-*a* to UE 115-*a* using a PTP transmission scheme configuration 225.

For example, base station 105-*a* may transmit, to UE 115-*b*, a DCI 215-*b* scheduling a data message 220-*b* which may be a retransmission of multicast data message 220-*a* (e.g., may include a same transport block (TB)). DCI 215-*b* may indicate a HARQ process ID associated with data message 220-*b* and an NDI for data message 220-*b*. The NDI may be kept unchanged from DCI 215-*a* if data message 220-*b* is a retransmission of previous data, and may be toggled (e.g., changed to a different value) if data message 220-*b* is a new data transmission. Base station 105-*a* may transmit the data message 220-*b* using a PTP transmission scheme configuration 225, such that the transmission of the data message 220-*b* may be associated with one or more PTP parameters for transmission and/or reception.

In some cases, it may be unclear which transmission scheme configuration (e.g., PTM or PTP) is used to transmit or receive a data message 220 (e.g., data message 220-*b*, or another data message 220) scheduled for retransmission. Additionally or alternatively, it may be unclear whether the data message 220 is a new transmission or a retransmission of a prior multicast or unicast data message 220. Thus, UE 115-*a* may not be aware of a transmission scheme configuration used to transmit or receive the data message 220, or whether to perform soft combining of the data message 220 with another data message 220 (e.g., whether to perform soft combining with data messages 220-*a* and 220-*b*).

The present disclosure provides techniques to include one or more of a HARQ process ID, an NDI, and a group-common or UE-specific RNTI in a DCI 215 (e.g., a grant or control message), for example, to indicate a transmission scheme configuration used to transmit or receive a data message 220 (e.g., one of a PTM or PTP transmission scheme configuration 225) and to indicate whether the data message 220 is a retransmission or a new transmission. In a first example, base station 105-a may transmit semi-static signaling (e.g., RRC signaling or other higher-layer signaling) to configure UE 115-a with a set of HARQ IDs, where one or more HARQ IDs in the set have been reserved for multicast data messages 220.

In such cases, if a grant (e.g., a DCI 215, such as DCI 215-b) includes a HARQ ID associated with one of the reserved HARQ IDs (e.g., via an indicated or preconfigured relationship) and has a CRC scrambled by a UE-specific RNTI (e.g., a C-RNTI), the data message 220 scheduled by the grant (e.g., data message 220-b) may be a retransmission of a multicast data message 220 (e.g., multicast data message 220-a) and may use a PTP transmission scheme configuration 225. If the grant includes the same HARQ ID as the original multicast data message 220 (e.g., multicast data message 220-a), the data message 220 scheduled by the grant may be a retransmission of the multicast data message 220 and may use a PTM transmission scheme configuration 210. If the grant includes a HARQ ID associated with one of the reserved HARQ IDs (e.g., via an indicated or preconfigured relationship) and has a CRC scrambled by a group-specific RNTI, the data message 220 scheduled by the grant may be a new transmission of a multicast data message 220 that uses a PTM transmission scheme configuration 210.

In a second example, HARQ IDs may be dynamically allocated to multicast and/or unicast data messages 220 via the corresponding scheduling grant (e.g., DCI 215). For example, UE 115-a may receive a first grant for a multicast data message 220 (e.g., multicast data message 220-a) associated with a first HARQ ID, and may receive a second grant for a second data message 220 (e.g., data message 220-b) that also includes the first HARQ ID. UE 115-a may identify whether the second data message 220 is a new multicast data message 220, a multicast retransmission of a prior multicast data message 220, a unicast retransmission of a prior multicast data message 220, a new unicast data message 220, or a unicast retransmission of a unicast data message 220.

For example, UE 115-a may identify such characteristics based on a combination of a RNTI (e.g., group-common or UE-specific RNTI) used to scramble the CRC of the second grant, an NDI of the second grant, and in some cases, based on an additional field of the second grant. If the CRC is scrambled with a group-common RNTI, UE 115-a may identify the second data message 220 as transmitted using the PTM transmission scheme configuration 210 and may monitor for the second data message 220 accordingly. If the CRC is scrambled with a UE-specific RNTI, UE 115-a may identify the second data message 220 as transmitted using the PTP transmission scheme configuration 225 and may monitor for the second data message 220 accordingly. If the NDI is toggled in the second grant (e.g., for either a UE-specific RNTI or a group-common RNTI), UE 115-a may identify the second data message 220 as a new transmission. If the NDI is untoggled (e.g., unchanged from the previous grant) in the second grant (e.g., for either a UE-specific RNTI or a group-common RNTI), UE 115-a may identify the second data message 220 as a retransmission of the multicast data message 220 scheduled by the first grant.

In some cases, if UE 115-a receives a third grant having a CRC scrambled with a group-common RNTI after receiving a grant having a CRC scrambled with a UE-specific RNTI, UE 115-a may identify a third data message 220 scheduled by the third grant as a new multicast message transmitted using the PTM transmission scheme configuration 210 and may monitor for the third data message 220 accordingly.

Figure 3A:
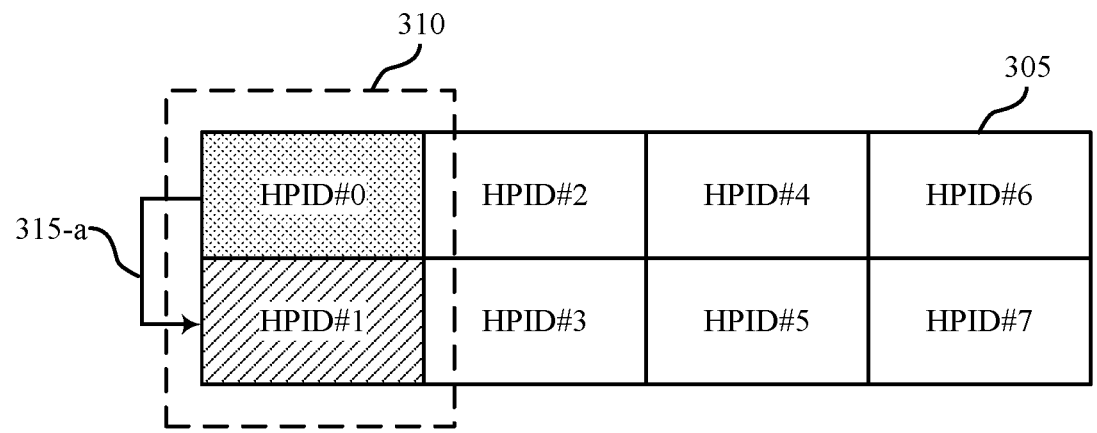
FIGS. 3A and 3B illustrate examples of feedback schemes in accordance with aspects of the present disclosure.
Figure 3B:
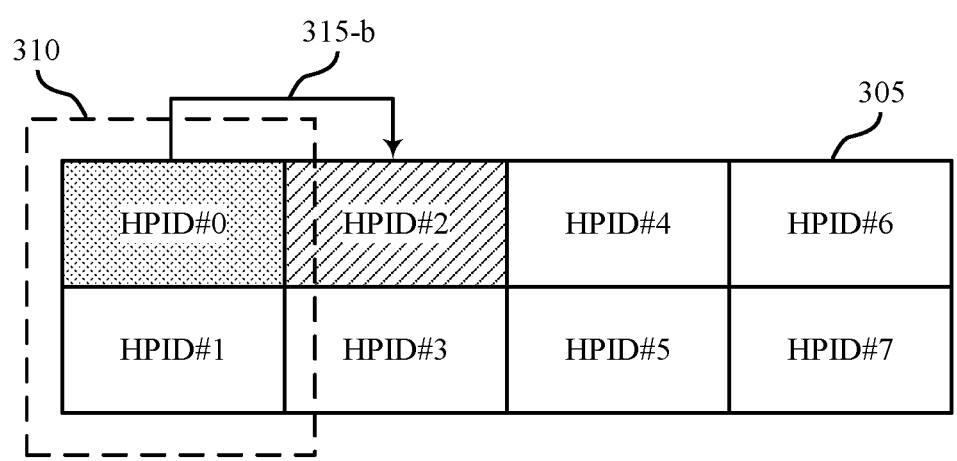

FIGS. 3A and 3B illustrate examples of feedback schemes 300 and 301 that support feedback techniques for mixed mode transmission schemes in accordance with aspects of the present disclosure. As described with reference to FIGS. 2A and 2B, a UE 115 and a base station 105 may communicate using a PTP transmission scheme configuration (e.g., for unicast messages) or a PTM transmission scheme configuration (e.g., for multicast messages), where, in some cases, the base station 105 may transmit a retransmission of a multicast message using a PTP transmission scheme configuration (e.g., as a unicast message). The UE 115 and the base station 105 may represent corresponding examples of a UE 115 and a base station 105 described with reference to FIGS. 1 and 2. FIGS. 3A and 3B may illustrate techniques for semi-static reservation of one or more HARQ processes for multicast messages.

For example, if the UE 115 is configured to receive multicast data on a serving cell (e.g., of the base station 105), the base station 105 may provide higher-layer signaling to reserve one or more HARQ processes (e.g., one or more HARQ process IDs 305, or HPIDs) for multicast. The reserved HARQ processes may be assigned to multicast data for a new transmission or for a retransmission, but may not be assigned to unicast data (e.g., a new unicast data message or a retransmission of a unicast data message). For example, the base station 105 may provide, to the UE 115, higher-layer signaling that semi-statically configures a set of HARQ process IDs 305 for retransmissions, where the signaling may indicate that a subset 310 of the HARQ process IDs 305 (e.g., HPIDs #0 and #1) is reserved for multicast. While the examples described herein and illustrated by FIGS. 3A and 3B include two HARQ process IDs 305 that are reserved for multicast, it is to be understood that any number of one or more HARQ process IDs 305 may be reserved for multicast.

In a first example, for a multicast data transmission, different HARQ processes may be assigned to the multicast data transmission made according to a PTM transmission scheme configuration and a retransmission of the multicast data that is made according to a PTP transmission scheme configuration. Both of the HARQ processes may be assigned from the subset 310 of reserved HARQ processes (e.g., of HARQ process IDs 305). In one example, a first HARQ process ID 305, HPID #0, may be assigned to a new multicast transmission. For retransmission of the multicast data according to a PTM transmission scheme configuration, HPID #0 may be assigned, for example, to retransmit the multicast data to multiple UEs 115 of a group. For retransmission of the multicast data according to a PTP transmission scheme configuration, HPID #1 may be assigned, for example, to retransmit the multicast data to the UE 115.

In such cases, an association 315-a may exist between the corresponding HARQ processes or HARQ process IDs 305 (e.g., between HPIDs #0 and #1), such that the UE 115 may determine that the transmission and the retransmission are of the same multicast data. The association 315-a may be based on a rule known to the UE 115 (e.g., as configured or stored at the UE 115, based on a wireless communication standard), or the association 315-a may be signaled to the UE 115, such as by higher-layer signaling or configurations. The association 315-a between the two HARQ process IDs 305 may not restrict usage of HPID #1, for example, for new multicast transmissions. For example, HPID #1 may be usable for a new multicast transmission according to the PTM transmission scheme configuration, or for the multicast retransmission according to the PTP transmission scheme configuration (e.g., to be combined with the multicast data transmission that was transmitted according to the PTM transmission scheme configuration).

For example, if HPID #1 is associated with HPID #0 (e.g., via the association 315-*a*), and if HPID #1 is assigned to a transmission according to the PTP transmission scheme configuration (e.g., the scheduling DCI is associated with a C-RNTI), the data message (e.g., PDSCH) on HPID #1 may be considered a multicast retransmission for HPID #0, transmitted according to the PTP transmission scheme configuration. In the examples described herein, the reserved multicast HARQ processes (e.g., of the subset 310) may not be used for unicast data, which may indicate that the PTP transmission assigned to HPID #1 is a multicast retransmission. In such cases, the UE 115 may soft combine the soft bits stored for the two multicast HARQ processes (e.g., HPIDs #0 and #1).

If HPID #1 is assigned to a transmission according to the PTM transmission scheme configuration (e.g., the scheduling DCI is associated with a group-common RNTI), the data message (e.g., PDSCH) may be new multicast data (e.g., other than the data for which HPID #0 is assigned). In the examples described herein, multicast retransmissions on different multicast HARQ processes may be reserved for multicast retransmissions according to the PTP transmission scheme configuration, which may indication that the PTM transmission assigned to HPID #1 is a new multicast transmission.

In a second example, for a multicast data transmission, different HARQ processes may be assigned to the multicast data transmission made according to a PTM transmission scheme configuration and a retransmission of the multicast data that is made according to a PTP transmission scheme configuration. The HARQ process (e.g., HARQ process ID 305) for the multicast data transmission may be assigned from the subset 310 of reserved HARQ processes (e.g., of HARQ process IDs 305), and the HARQ process (e.g., HARQ process ID 305) for the retransmission of the multicast data may be assigned from another HARQ process, for example, outside of the subset 310. In one example, a first HARQ process ID 305, HPID #0, may be assigned to a new multicast transmission. For retransmission of the multicast data according to a PTP transmission scheme configuration, HPID #0 may be assigned, for example, to retransmit the multicast data to multiple UEs 115 of a group. For retransmission of the multicast data according to a PTP transmission scheme configuration, HPID #2 may be assigned, for example, to retransmit the multicast data to the UE 115.

In such cases, an association 315-*b* may exist between the corresponding HARQ processes or HARQ process IDs 305 (e.g., between HPIDs #0 and #2), such that the UE 115 may determine that the transmission and the retransmission are of the same multicast data. The association 315-*b* may be based on a rule known to the UE 115 (e.g., as configured or stored at the UE 115, based on a wireless communication standard), or the association 315-*b* may be signaled to the UE 115, such as by higher-layer signaling or configurations. The association 315-*b* between the two HARQ process IDs 305 may not restrict usage of HPID #2, for example, for new multicast transmissions. For example, HPID #2 may be usable for a new unicast transmission according to the PTP transmission scheme configuration, for a unicast retransmission according to the PTP transmission scheme configuration (e.g., to be combined with a unicast data transmission transmitted according to the PTP transmission scheme configuration), or for the multicast retransmission according to the PTP transmission scheme configuration (e.g., to be combined with the multicast data transmission that was transmitted according to the PTM transmission scheme configuration).

In one example, HPID #2 may be associated with HPID #0 (e.g., via the association 315-*b*), and HPID #2 may be assigned to a transmission according to the PTP transmission scheme configuration (e.g., the scheduling DCI is associated with a C-RNTI). In such cases, the data message (e.g., PDSCH) on HPID #2 may be considered a multicast retransmission for HPID #0 transmitted according to the PTP transmission scheme configuration, a new unicast transmission on HPID #2, or a unicast retransmission on HPID #2. In order to distinguish between these three possibilities, a new field or bit(s) (e.g., a bit field) may be introduced to the DCI (e.g., control message, grant) scheduling the transmission according to the PTP transmission scheme configuration. The field or bit(s) may indicate, for example, whether or not the transmission is for a multicast retransmission according to a PTP transmission scheme configuration for the associated HARQ process. Based on the field or bit(s), the UE 115 may identify one of the three possibilities for the transmission.

If HPID #1 is assigned to a transmission according to the PTM transmission scheme configuration (e.g., the scheduling DCI is associated with a group-common RNTI), the data message (e.g., PDSCH) may be new multicast data (e.g., other than the data for which HPID #0 is assigned). In the examples described herein, multicast retransmissions on different multicast HARQ processes may be reserved for multicast retransmissions according to the PTP transmission scheme configuration, which may indication that the PTM transmission assigned to HPID #1 is a new multicast transmission.

In either the first example or the second example, the UE 115 may identify whether the multicast data transmission according to the PTM transmission scheme configuration is a new transmission or a retransmission based on an NDI value in a DCI scheduling the multicast data transmission. If the NDI value is toggled from a previous DCI, the multicast data transmission may be a new transmission, while if the NDI value is untoggled from a previous DCI, the multicast data transmission may be a retransmission.

For example, if the NDI in the DCI for the PTM transmission (e.g., the multicast data transmission) on HPID #0 is toggled, the UE 115 may consider the PTM transmission on HPID #0 a new multicast transmission. In such cases, if a multicast retransmission (e.g., a PTP transmission) has been stored on the HARQ process associated with HPID #0 (e.g., on HPID #1 or HPID #2), any stored soft bits on the first HARQ process (e.g., HPID #0) may be flushed, as well as any stored soft bits on the associated HARQ process.

In the first example, if a DCI for a PTM transmission (e.g., a multicast data transmission) on HPID #1 is detected, the UE 115 may consider the PTM transmission on HPID #1 a new transmission. In the second example, if a DCI for a PTP transmission (e.g., a unicast data transmission) on HPID #2 is detected, the UE 115 may consider the PTP transmission on HPID #2 a new transmission. In either of these examples, the UE 115 may determine what to do with any stored soft bits that may be associated with a previous multicast data retransmission on HPID #1 or HPID #2. For example, the UE 115 may flush soft bits on HPID #1 or HPID #2, while not flushing soft bits on HPID #0. In this case, multicast retransmissions may continue using HPID #0 (e.g., because the soft bits on HPID #0 may still be available for soft combining). Additionally or alternatively, the UE 115 may flush the soft bits on HPID #1 or HPID #2, as well as those on HPID #0. In this case, multicast retransmissions may not continue using HPID #0 (e.g., because the soft bits on this HARQ process are flushed).

Figure 4:
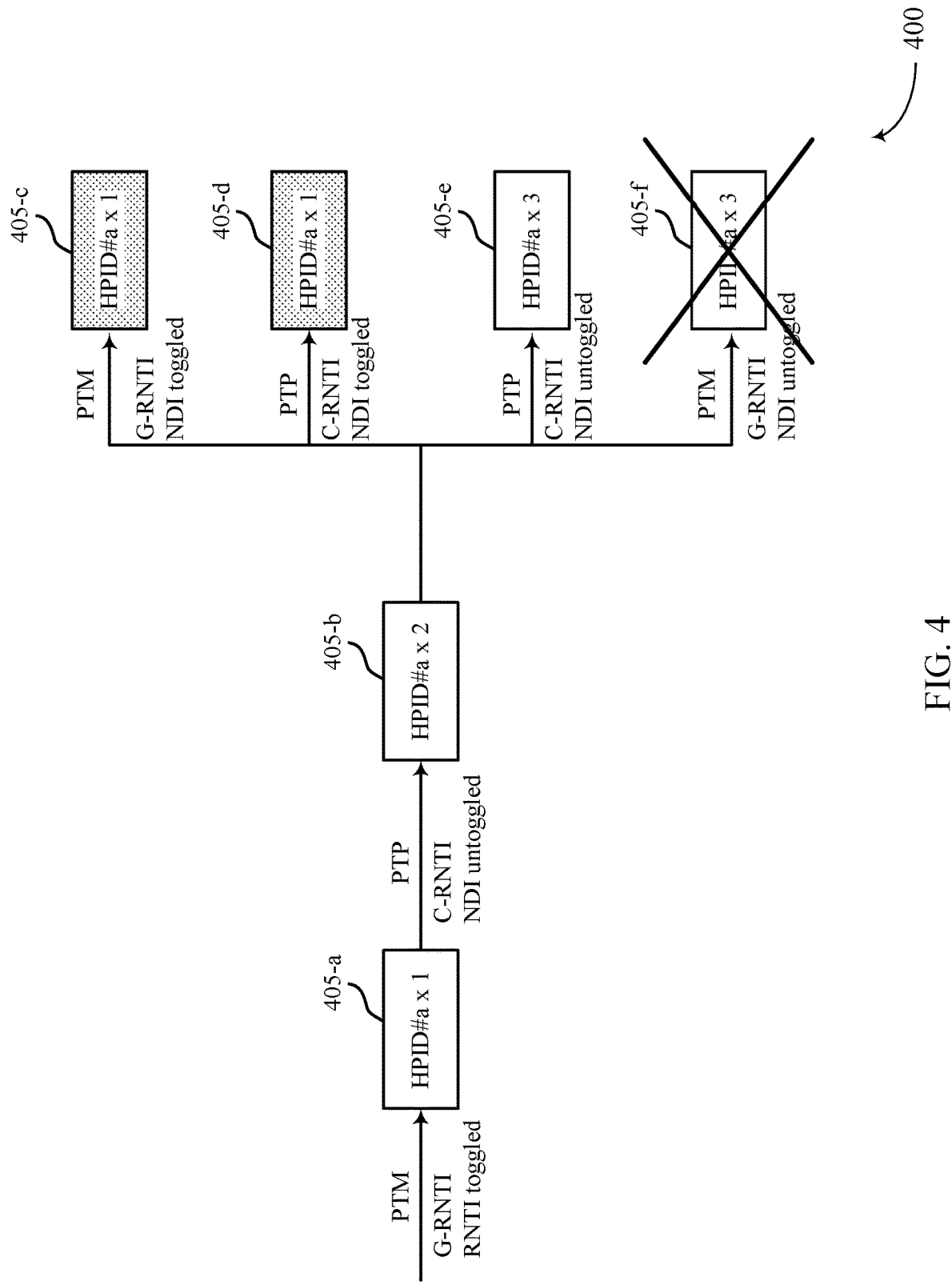
FIG. 4 illustrates an example of a transmission scheduling scheme in accordance with aspects of the present disclosure.

FIG. 4 illustrates an example of a transmission scheduling scheme 400 in accordance with aspects of the present disclosure. As described with reference to FIGS. 2A and 2B, a UE 115 and a base station 105 may communicate using a PTP transmission scheme configuration (e.g., for unicast messages) or a PTM transmission scheme configuration (e.g., for multicast messages), where, in some cases, the base station 105 may transmit a retransmission of a multicast message using a PTP transmission scheme configuration (e.g., as a unicast message). The UE 115 and the base station 105 may represent corresponding examples of a UE 115 and a base station 105 described with reference to FIGS. 1-3. FIG. 4 may illustrate techniques for dynamic sharing of one or more HARQ processes between multicast messages and unicast messages.

For example, if the UE 115 is configured to receive multicast data on a serving cell (e.g., of the base station 105), a HARQ process for a transmission may be assigned to multicast or unicast dynamically, per each scheduling DCI (e.g., control message, grant). A retransmission of a multicast message may use a same HARQ process (e.g., a same HARQ process ID) that has been assigned to transmission of an initial multicast message (e.g., transmitted according to a PTM transmission scheme configuration). The same HARQ process may be assigned to the retransmission regardless of whether the retransmission is according to a PTP transmission scheme configuration or the PTM transmission scheme configuration (e.g., as indicated by the RNTI used to scramble the CRC of the DCI). As such, a HARQ operation (e.g., even a HARQ operation involving both transmission scheme configurations) may not involve more than one HARQ process.

An NDI of a scheduling DCI may be a common indicator (e.g., of a state machine) for a new transmission or a retransmission for a HARQ process, for example, no matter whether the HARQ process is associated with the PTP transmission scheme configuration or the PTM transmission scheme configuration (e.g., as indicated by the RNTI used to scramble the CRC of the DCI). If the value of the NDI does not change (e.g., is untoggled) from an NDI value of the previous scheduling DCI for the same HARQ process, the NDI may indicate that the current transmission is a retransmission. Otherwise, if the value of the NDI is toggled from the NDI value of the previous scheduling DCI for the same HARQ process, the NDI may indicate that the current transmission is a new transmission.

In some cases, instead of using the NDI value, the RNTI scrambling the CRC of the DCI may be used to identify a new transmission or a retransmission. For example, in some cases, the previous DCI for a HARQ process may be associated with the PTP transmission scheme configuration (e.g., by scrambling the CRC with a C-RNTI) and the current DCI may be associated with the PTM transmission scheme configuration (e.g., by scrambling the CRC with a group RNTI). In such cases, the transmission (e.g., PTM transmission) scheduled by the current DCI may be considered a new transmission, for example, regardless of a value or state of the NDI in the current DCI (e.g., regardless of whether the NDI is toggled or untoggled).

For example, the UE 115 may receive a first DCI (e.g., control message, grant) from the base station 105 indicating an HPID #a and scheduling a message 405-a according to the PTM transmission scheme configuration, for example, by having a CRC scrambled by a group RNTI (e.g., G-RNTI). The first DCI may also include an NDI having a value that may be toggled or untoggled from a previous DCI for HPID #a. An RNTI of the previous DCI for HPID #a may have been a UE-specific RNTI (e.g., a C-RNTI), such that the RNTI associated with HPID #a may be toggled from the previous DCI. The toggling of the RNTI from a UE-specific RNTI to a group RNTI may indicate that the message 405-a is a new multicast data message (e.g., with or without toggling the associated NDI). The UE 115 may monitor for the message 405-a based on the indication of the new multicast data message.

In some cases, after receiving the first DCI for message 405-a, the UE 115 may receive a second DCI scheduling another message 405 for HPID #a and scheduling the other message 405 according to the PTM transmission scheme configuration, for example, by having a CRC scrambled by the group RNTI. The second DCI may also have an NDI value that is untoggled from the NDI value of the first DCI, such that the second DCI may indicate that the other message 405 is a PTM retransmission (e.g., multicast retransmission) of the message 405-a (e.g., of the initial multicast data message). The UE 115 may monitor for the other message 405 based on the indication of the retransmitted multicast data message.

In some other cases, after receiving the first DCI for message 405-a, the UE 115 may receive a second DCI scheduling a message 405-b for HPID #a and scheduling the message 405-b according to the PTP transmission scheme configuration, for example, by having a CRC scrambled by a UE-specific RNTI (e.g., C-RNTI). The second DCI may also have an NDI value that is untoggled from the NDI value of the first DCI, such that the second DCI may indicate that the message 405-b is a PTP retransmission (e.g., unicast retransmission) of the message 405-a (e.g., of the initial multicast data message). The UE 115 may monitor for the message 405-b based on the indication of the unicast retransmission of the multicast data message.

In a first example, after receiving the second DCI for message 405-b, the UE 115 may receive a third DCI scheduling a message 405-c for HPID #a and scheduling the message 405-c according to the PTM transmission scheme configuration, for example, by having a CRC scrambled by a group RNTI (e.g., G-RNTI). The third DCI may also have an NDI value that is toggled from the NDI value of the first and second DCIs, such that the third DCI may indicate that the message 405-c is a PTM new transmission of a second multicast data message. The UE 115 may monitor for the message 405-c based on the indication of the new transmission of the second multicast data message.

In a second example, after receiving the second DCI for message 405-b, the UE 115 may receive a third DCI scheduling a message 405-d for HPID #a and scheduling the message 405-d according to the PTP transmission scheme configuration, for example, by having a CRC scrambled by a UE-specific RNTI (e.g., C-RNTI). The third DCI may also have an NDI value that is toggled from the NDI value of the first and second DCIs, such that the third DCI may indicate that the message 405-d is a PTP new transmission of a unicast data message. The UE 115 may monitor for the message 405-d based on the indication of the new transmission of the unicast data message.

In a third example, after receiving the second DCI for message 405-b, the UE 115 may receive a third DCI scheduling a message 405-e for HPID #a and scheduling the message 405-e according to the PTP transmission scheme configuration, for example, by having a CRC scrambled by a UE-specific RNTI (e.g., C-RNTI). The third DCI may also have an NDI value that is untoggled from the NDI value of the first and second DCIs, such that the third DCI may indicate that the message 405-e is a PTP retransmission (e.g., a second retransmission) of the multicast data message. The UE 115 may monitor for the message 405-e based on the indication of the unicast retransmission of the multicast data message.

In some cases, a fourth example may be envisioned but may not occur, for example, based on indicating a new transmission of a multicast data message by toggling an RNTI from a UE-specific RNTI to a group RNTI. In the fourth example, after receiving the second DCI for message 405-b, the UE 115 may receive a third DCI scheduling a message 405-f for HPID #a and scheduling the message 405-f according to the PTM transmission scheme configuration, for example, by having a CRC scrambled by a group RNTI (e.g., G-RNTI). The third DCI may have an NDI value that is untoggled from the NDI value of the first and second DCIs, such that the third DCI may indicate that the message 405-f is a PTM retransmission (e.g., a second retransmission) of the multicast data message. However, as described herein, toggling from a UE-specific RNTI to a group RNTI (e.g., whether or not the NDI is toggled) may indicate transmission of a new multicast data message using the PTM transmission scheme configuration, such that the fourth example (e.g., a multicast retransmission following a unicast retransmission) may not occur. As such, the fourth example may be considered an unused state of a combination of an RNTI and NDI value. In a fifth example, after receiving the second DCI for message 405-b, a data message scheduled by a DCI having a CRC scrambled by a group RNTI (e.g., G-RNTI) may be a new data transmission (e.g., is always considered to be a new data transmission) regardless of whether the NDI in the DCI is toggled or untoggled.

Figure 5:
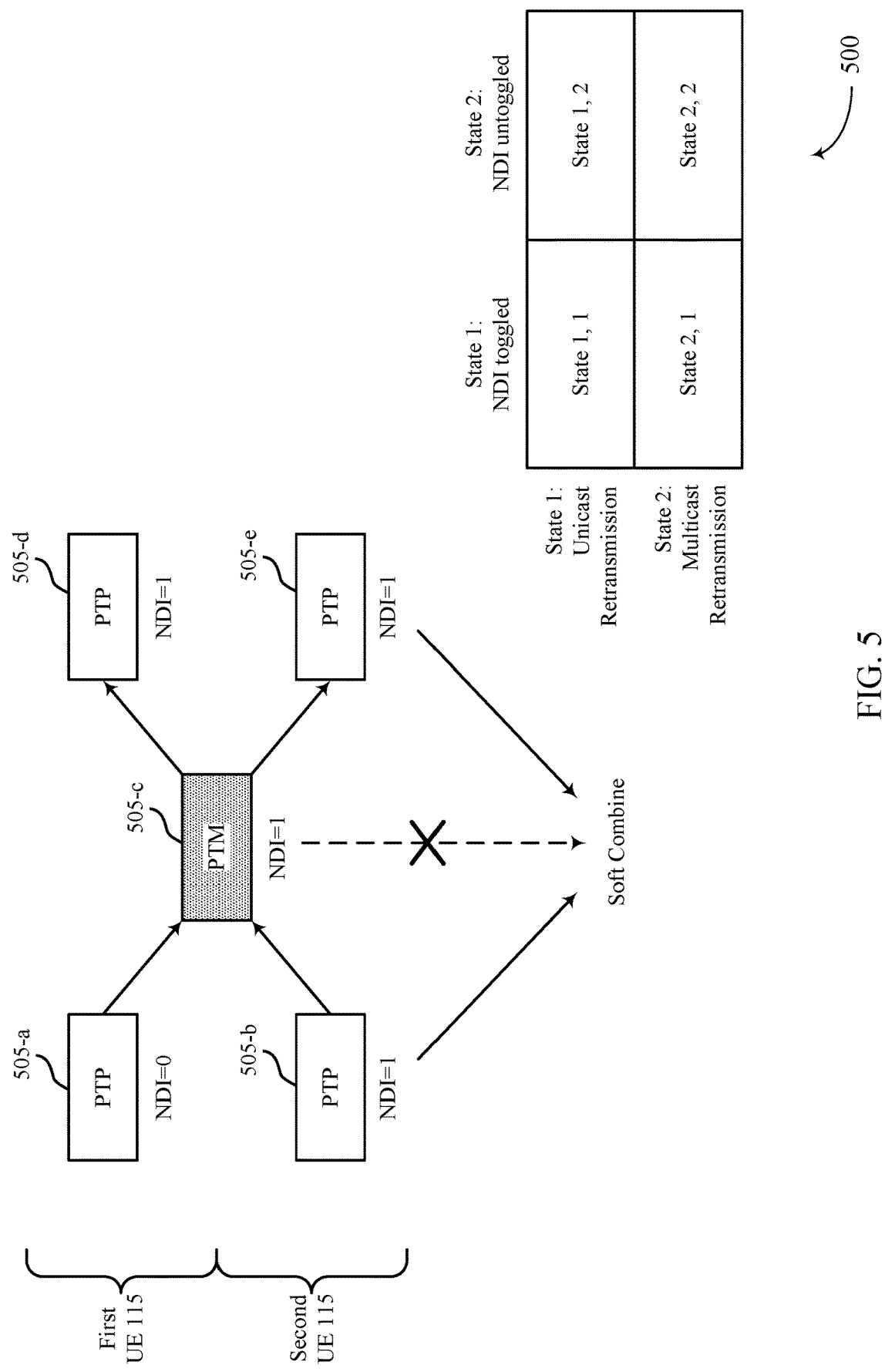
FIG. 5 illustrates an example of a transmission scheduling scheme in accordance with aspects of the present disclosure.

FIG. 5 illustrates an example of a transmission scheduling scheme 500 in accordance with aspects of the present disclosure. As described with reference to FIGS. 2A, 2B, and 4, a first UE 115, a second UE 115, and a base station 105 may communicate using a PTP transmission scheme configuration (e.g., for unicast messages) or a PTM transmission scheme configuration (e.g., for multicast messages), where, in some cases, the base station 105 may transmit a retransmission of a multicast message using a PTP transmission scheme configuration (e.g., as a unicast message). The first UE 115, the second UE 115, and the base station 105 may represent corresponding examples of UEs 115 and a base station 105 described with reference to FIGS. 1-4. FIG. 5 may illustrate techniques for dynamic sharing of one or more HARQ processes between multicast messages and unicast messages, for example, as described with reference to FIG. 4.

For example, FIG. 5 may illustrate an example in which a missed detection of a DCI may cause a problem for soft combining an initial multicast data message with a retransmission of the multicast data message. As described with reference to FIG. 4, a combination of an NDI value and an RNTI for a DCI may be used to identify a message as a new transmission or a retransmission of a multicast data message or a unicast data message. In the example illustrated by FIG. 5, the first UE 115 may receive a DCI scheduling a message 505-a for a HARQ process, where the DCI indicates an original NDI state of '0' and where the message 505-a is associated with a PTP transmission scheme configuration, for example, based on a CRC of the DCI being scrambled with a UE-specific RNTI (e.g., C-RNTI). The second UE 115 may receive a DCI scheduling a message 505-b for the same HARQ process, where the DCI indicates an original NDI state of '1' and where the message 505-b is associated with a PTP transmission scheme configuration, for example, based on a CRC of the DCI being scrambled with a UE-specific RNTI (e.g., C-RNTI).

In some cases, both UEs 115 may receive a respective second DCI after receiving the respective original DCIs, where the second DCI may schedule a new multicast message 505-c for the HARQ process according to a PTM transmission scheme configuration, for example, based on a CRC of the second DCI being scrambled with a group RNTI. Both UEs 115 may consider the second DCI as scheduling a new transmission, for example, based on the RNTI being toggled from a UE-specific RNTI to a group RNTI for the HARQ process. The NDI for the second DCI is illustrated as having a value of '1,' but may have a value of either '1' or '0,' based on toggling the RNTI.

In some cases, the network (e.g., the base station 105) may schedule a respective retransmission of the message 505-c (e.g., using the same HARQ process) according to the PTP transmission scheme configuration for both UEs 115, for example, using respective third DCIs. The third DCIs may respectively schedule a message 505-d for the first UE 115 and a message 505-e for the second UE 115. The third DCIs may each have a CRC that is scrambled by the respective UE-specific RNTI and may have a same NDI value (e.g., untoggled NDI) as the second DCI (e.g., a value of '1'), which may indicate that the message 505-d and the message 505-e are retransmissions of the message 505-c, according to the PTP transmission scheme configuration.

In some cases, the second UE 115 may miss detection of the second DCI (e.g., scheduling message 505-c), such that the second UE 115 may consider that the NDI of the third DCI (e.g., scheduling message 505-e) is untoggled from the original DCI (e.g., both DCIS indicate a NDI value of '1'). As such, the second UE 115 may consider the message 505-e as a retransmission of the message 505-b, which is a unicast data message (e.g., instead of a retransmission of the message 505-c, which is a multicast data message). In such cases, the second UE 115 may attempt to soft combine data from message 505-b with data from message 505-e, which may result in communication errors.

In order to address this problem, a scheduling DCI (e.g., the third DCI) may include a field or bit(s), which may indicate whether the scheduled message 505 is a multicast data message or a unicast data message. In some examples, the field or bit(s) may indicate that the scheduled message 505 is a retransmission of a multicast data message or a unicast data message. As such, a combination of the NDI value of the DCI and the field or bit(s) of the DCI (e.g., a cast indicator field) may indicate one of four states of a message 505 scheduled by the DCI. For example, the cast indicator field (e.g., a value of the field) may indicate a state 1 for retransmission of a unicast data message or a state 2 for retransmission of a multicast retransmission. Similarly, the NDI value (e.g., a toggled or untoggled value) may indicate a state 1 for a new transmission (e.g., NDI toggled) or a state 2 for a retransmission (e.g., NDI untoggled). Thus, the combination of the NDI value and the cast indicator field may indicate a new transmission of a unicast data message (e.g., state 1, 1), a new transmission of a multicast data message (e.g., state 2, 1), a retransmission of a unicast data message (e.g., state 1, 2), or a retransmission of a multicast data message (e.g., state 2, 2).

Such indications may be independent from a RNTI associated with the scheduling DCI, such that a receiving UE 115 may be able to identify whether a transmission is a new transmission or a retransmission, as well as a transmission scheme configuration for an original message 505, independent of an associated RNTI (e.g., which may indicate a transmission scheme configuration for the scheduled message 505).

Figure 6:
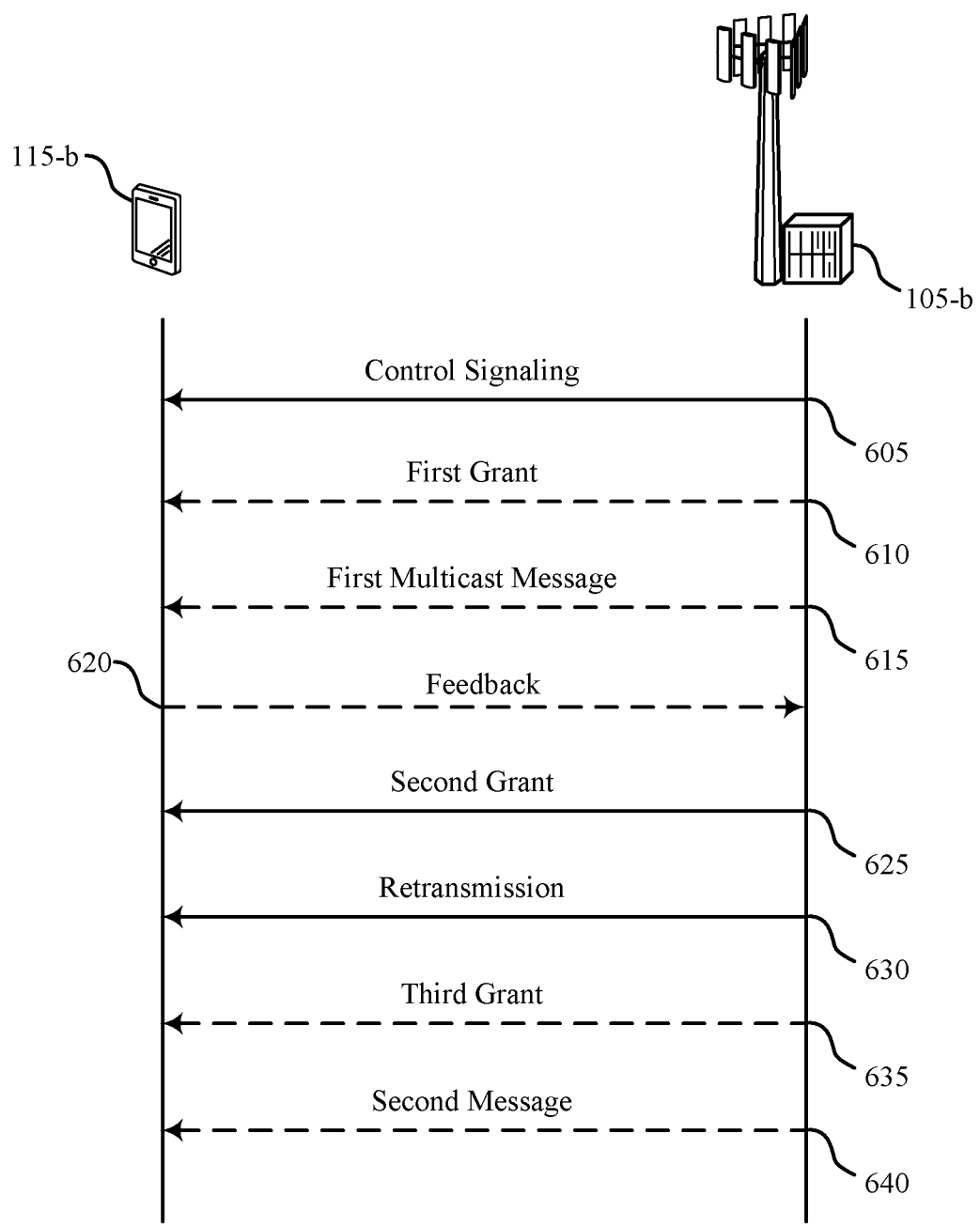
FIG. 6 illustrates an example of a process flow in accordance with aspects of the present disclosure.

FIG. 6 illustrates an example of a process flow 600 in accordance with aspects of the present disclosure. In some examples, process flow 600 may implement or be implemented by some aspects of wireless communications system 100, 200, or 201. In some examples, process flow 600 may additionally or alternatively implement or be implemented by some aspects of feedback schemes 300 or 301. For example, process flow 600 may be implemented by a base station 105-*b* and a UE 115-*b*, which may represent respective examples of a base station 105 and a UE 115 described with reference to FIGS. 1-5. As described herein, UE 115-*b* and base station 105-*b* may communicate using a PTP transmission scheme configuration (e.g., for unicast messages) or a PTM transmission scheme configuration (e.g., for multicast messages), where, in some cases, base station 105-*b* may transmit a retransmission of a multicast message using a PTP transmission scheme configuration (e.g., as a unicast message).

In the following description of process flow 600, the operations may be performed in a different order than the order shown, or the operations performed by UE 115-*b* and base station 105-*b* may be performed in different orders or at different times. For example, specific operations may also be left out of process flow 600, or other operations may be added to process flow 600. Although UE 115-*b* and base station 105-*b* are shown performing the operations of process flow 600, some aspects of some operations may also be performed by one or more other wireless devices.

At 605, base station 105-*b* may transmit, to UE 115-*b*, control signaling indicating multiple feedback process IDs (e.g., HARQ IDs), where the multiple feedback process IDs may include a first feedback process ID reserved for multicast transmission (e.g., among other feedback process IDs). For example, as described with reference to FIGS. 3A and 3B, base station 105-*b* may transmit RRC signaling to UE 115-*b*, indicating a subset of one or more HARQ IDs or HARQ processes reserved for multicast transmission. In some cases, the subset of one or more HARQ IDs may be useable for multicast transmissions (e.g., new multicast data messages or retransmitted multicast data messages), and in some cases, the subset may be useable for multicast transmissions (e.g., new or retransmitted multicast data messages) or unicast transmissions (e.g., unicast retransmissions of a multicast data message).

At 610, in some cases, base station 105-*b* may transmit a first grant (e.g., DCI, control message) to UE 115-*b*, which may schedule a first multicast message. The first grant may include an indication of a toggled NDI or an untoggled NDI, which may respectively indicate that the first multicast message is a new transmission or a retransmission. A CRC of the first grant may be scrambled with a group RNTI, such that the grant may indicate that the first multicast transmission is to be transmitted or received according to a PTM transmission scheme configuration. The first grant may indicate that the first multicast transmission is associated with the first feedback process ID. Based on the first grant, UE 115-*b* may monitor for the first multicast message in accordance with the PTM transmission scheme configuration.

At 615, in some cases, base station 105-*b* may transmit the first multicast message to UE 115-*b*, in accordance with the PTM transmission scheme configuration. In some cases, UE 115-*b* may not receive or decode an entirety of the first multicast message, based on monitoring for the first multicast message.

Accordingly, at 620, UE 115-*b* may transmit feedback to base station 105-*b* based on monitoring for the first multicast transmission, where the feedback may correspond to the first feedback process ID. For example, UE 115-*b* may transmit HARQ feedback to base station 105-*b*, indicating that UE 115-*b* failed to decode or receive the first multicast message.

At 625, base station 105-*b* may transmit, to UE 115-*b*, a second grant scheduling retransmission of the first multicast message and indicating a second feedback process IDs of the multiple feedback process IDs. As described herein with reference to FIGS. 3A and 3B, the second feedback process ID may be associated with the first feedback process ID, such that the second feedback process ID may indicate a retransmission of the first multicast message. In some cases, the first and second feedback process IDs may be the same ID (e.g., if the retransmission is a PTM or multicast transmission). In some cases, the second feedback process ID may be included in the subset of one or more feedback IDs reserved for multicast transmission. In some cases, the second feedback process ID may not be included in the subset of one or more feedback IDs reserved for multicast transmission.

At 630, base station 105-*b* may transmit, to UE 115-*b*, the retransmission of the multicast message in accordance with a PTP transmission scheme configuration or a PTM transmission scheme configuration based on the second feedback process ID, for example, as described with reference to FIGS. 3A and 3B. UE 115-*b* may monitor for the retransmission of the multicast message in accordance with the PTP transmission scheme configuration or PTM transmission scheme configuration based on the second feedback process ID, for example, as described with reference to FIGS. 3A and 3B. For example, if the second feedback process ID is the same as the first feedback process ID, UE 115-*b* may monitor according to the PTM transmission scheme configuration. Similarly, if the second feedback process ID is different from, but associated with, the first feedback process ID, UE 115-*b* may monitor according to the PTP transmission scheme configuration.

At 635, in some cases, base station 105-*b* may transmit, to UE 115-*b*, a third grant including the second feedback process ID and scheduling transmission of a second message. The second message may be a multicast message or a unicast message, as indicated by a bit set (e.g., CRC) of the third grant scrambled with either the group RNTI or the UE-specific RNTI, respectively. The third grant may also include an NDI indicating that the second message includes one of new data or previously transmitted data. In some cases, the third grant may additionally include a bit field indicating whether the second message is a multicast message or a unicast message. In some examples, the bit field may indicate that the second message is a retransmission of a multicast data message or a unicast data message. UE 115-*b* may monitor for the second message using the PTP or PTM transmission scheme configuration, and as a new or retransmission, based on the values of the RNTI, the NDI, and, in some cases, the bit field.

At 640, in some cases, base station 105-*b* may transmit the second message to UE 115-*b*, for example, according to the PTP or PTM transmission scheme configuration, and as a new transmission or a retransmission, based on the values indicated by the DCI.

Figure 7:
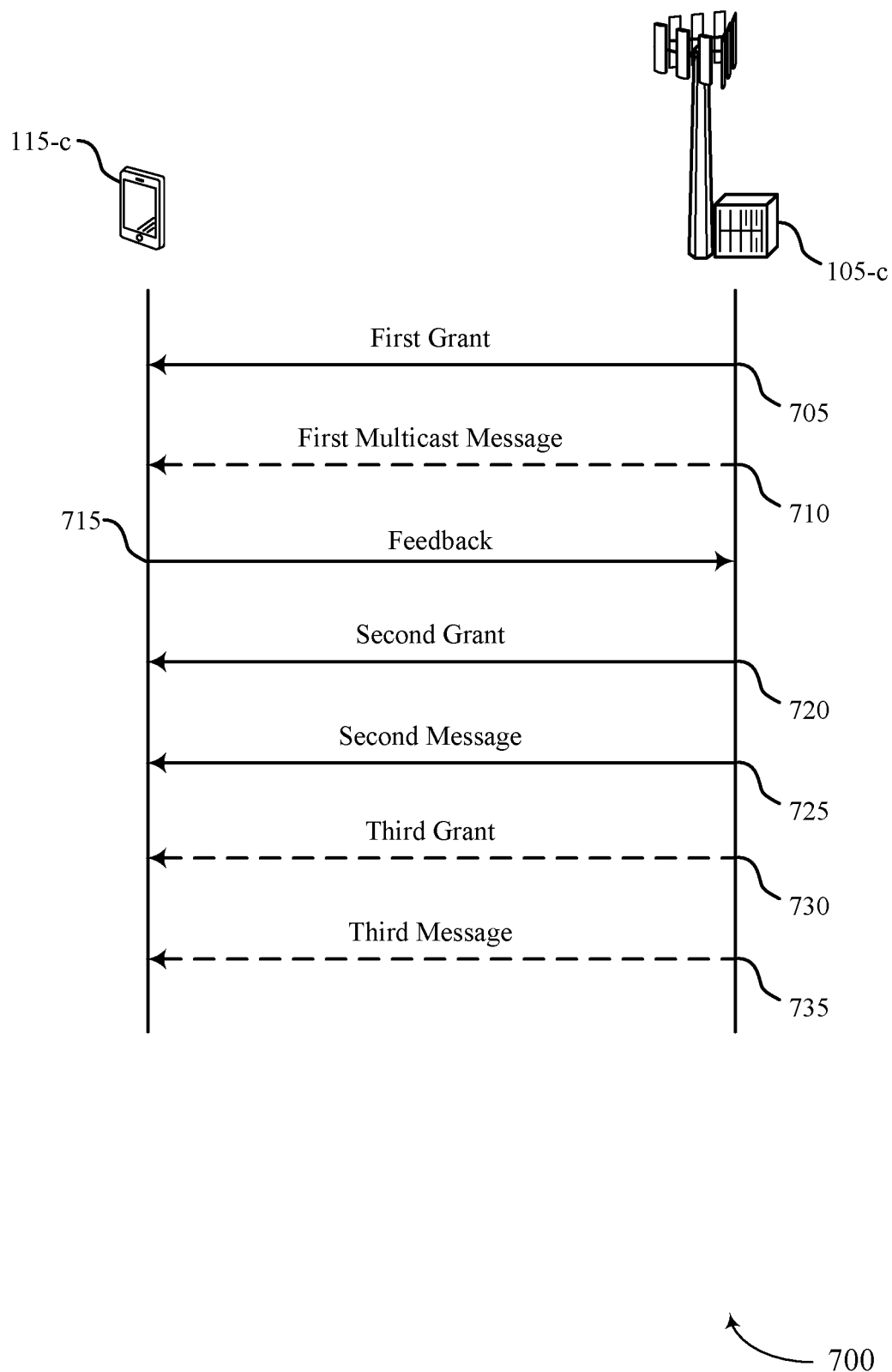
FIG. 7 illustrates an example of a process flow in accordance with aspects of the present disclosure.

FIG. 7 illustrates an example of a process flow 700 in accordance with aspects of the present disclosure. In some examples, process flow 700 may implement or be implemented by some aspects of wireless communications system 100, 200, or 201. In some examples, process flow 700 may additionally or alternatively implement or be implemented by some aspects of transmission scheduling schemes 400 or 500. For example, process flow 700 may be implemented by a base station 105-*c* and a UE 115-*c*, which may represent respective examples of a base station 105 and a UE 115 described with reference to FIGS. 1-6. As described herein, UE 115-*c* and base station 105-*c* may communicate using a PTP transmission scheme configuration (e.g., for unicast messages) or a PTM transmission scheme configuration (e.g., for multicast messages), where, in some cases, base station 105-*c* may transmit a retransmission of a multicast message using a PTP transmission scheme configuration (e.g., as a unicast message).

In the following description of process flow 700, the operations may be performed in a different order than the order shown, or the operations performed by UE 115-*c* and base station 105-*c* may be performed in different orders or at different times. For example, specific operations may also be left out of process flow 700, or other operations may be added to process flow 700. Although UE 115-*c* and base station 105-*c* are shown performing the operations of process flow 700, some aspects of some operations may also be performed by one or more other wireless devices.

At 705, base station 105-*c* may transmit, to UE 115-*c*, a first grant (e.g., DCI, control message) scheduling transmission of a first multicast message in accordance with a PTM transmission scheme configuration, the first grant indicating a first feedback process ID for the first multicast message and a first NDI having a first value (e.g., indicating a new transmission or a retransmission). UE 115-*c* may monitor for the first multicast message based on the first grant.

At 710, in some cases, base station 105-*c* may transmit the first multicast message to UE 115-*c*, for example, based on the first grant. In some cases, UE 115-*c* may fail to completely receive and/or decode the first multicast message based on monitoring for the first multicast message.

At 715, UE 115-*c* may transmit, to base station 105-*c*, feedback for the first multicast message, where the feedback corresponds to the first feedback process ID. For example, UE 115-*b* may transmit acknowledgement/negative acknowledgement (ACK/NACK) feedback indicating whether the first multicast message was properly received. In some cases, UE 115-*c* may transmit HARQ feedback indicating a failure to completely decode the first multicast message.

At 720, base station 105-*c* may transmit, to UE 115-*c*, a second grant scheduling transmission of a second message and indicating the first feedback process ID for the second message. The second grant may also include an indication of one of a UE-specific ID (e.g., UE-specific RNTI) or group ID (e.g., group RNTI) and may include a second NDI having a second value. In some cases, the second value may be the same as the first value, which may indicate that the second message is a retransmission of the first multicast message. In some cases, the second value may be different from the first value, which may indicate that the second message is a new transmission (e.g., is not a retransmission of the first multicast message).

In some cases, the second grant may have a CRC (e.g., bit field) that is scrambled by the UE-specific ID, which may indicate that the second message is transmitted or received in accordance with the PTP transmission scheme configuration. In some cases, the second grant may have a CRC (e.g., bit field) that is scrambled by the group ID, which may indicate that the second message is transmitted or received in accordance with the PTM transmission scheme configuration. In some cases, the second grant may include a cast indicator bit field, which may indicate whether the second message is a retransmission of a unicast message or a multicast message. For example, the cast indicator bit field may indicate that the second message is a retransmission of a multicast message (e.g., the first multicast message).

At 725, base station 105-*c* may transmit, to UE 115-*c*, the second message in accordance with the PTP transmission scheme configuration or the PTM transmission scheme configuration based on the indication of the UE-specific ID or group ID and based on the second NDI. UE 115-*c* may monitor for the second message in accordance with the PTP transmission scheme configuration or the PTM transmission scheme configuration based on the indication of the UE-specific ID or group ID and based on the second NDI, for example, as described with reference to FIGS. 2 and 4. For example, based on the indication of the ID and the NDI (e.g., and in some cases the cast indicator field), the UE 115-*c* may identify whether the second message is a new transmission or a retransmission of a multicast message or a unicast message, and whether the second message is transmitted according to the PTP or PTM transmission scheme configuration. UE 115-*c* may monitor for the second message based on determining one or more of these characteristics.

At 730, in some cases, base station 105-*c* may transmit, to UE 115-*c*, a third grant scheduling transmission of a third message and including a bit field (e.g., CRC) scrambled by the UE-specific or group ID. In some cases, the second message may be transmitted according to the PTP transmission scheme configuration (e.g., may be associated with the UE-specific ID), and the third message may be associated with the group ID (e.g., to indicate transmission in accordance with the PTM transmission scheme configuration). In such cases, UE 115-*c* may identify that the third message is a new transmission of multicast data, based on the change in IDs (e.g., change in RNTIs).

In some cases, the second message may be a new unicast message and the third grant may include the bit field scrambled by the UE-specific ID and may include a third NDI having the second value (e.g., a same value as for the second message). In such cases, UE 115-*c* may identify the third message as a retransmission of the second message (e.g., of a unicast message) based on the third NDI and the UE-specific ID. In some cases, the third grant may further include a cast indicator bit field, which may indicate that the third message is a retransmission of a unicast message (e.g., the second message).

At 735, in some cases, base station 105-*c* may transmit, to UE 115-*c*, the third message, for example, based on the third grant. UE 115-*c* may monitor for the third message based on identifying the third message as a new transmission or retransmission of a unicast message or a multicast message, as well as based on identifying the third message as a unicast transmission or a multicast transmission.

Figure 8:
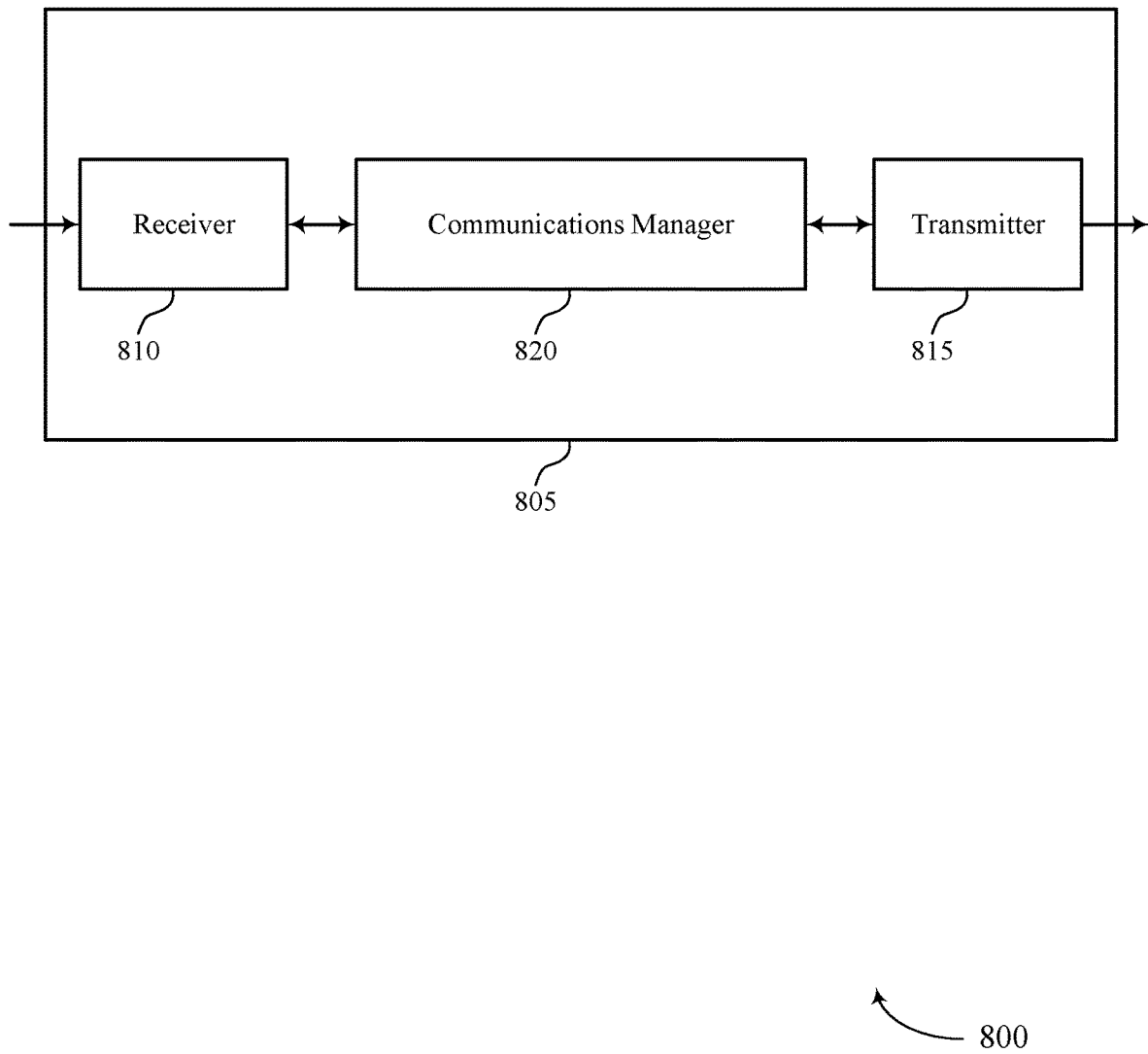
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to feedback techniques for mixed mode transmission schemes). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to feedback techniques for mixed mode transmission schemes). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of feedback techniques for mixed mode transmission schemes as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. For example, the communications manager 820 may be configured as or otherwise support a means for receiving control signaling indicating a set of multiple feedback process IDs, where the set of multiple feedback process IDs includes a first feedback process ID reserved for multicast transmission. The communications manager 820 may be configured as or otherwise support a means for receiving a grant scheduling a retransmission of a multicast message and indicating a second feedback process ID of the set of multiple feedback process IDs. The communications manager 820 may be configured as or otherwise support a means for monitoring for the retransmission of the multicast message in accordance with a PTP transmission scheme configuration or a PTM transmission scheme configuration based on the second feedback process ID.

Additionally or alternatively, the communications manager 820 may support wireless communication at a UE in accordance with examples as disclosed herein. For example, the communications manager 820 may be configured as or otherwise support a means for receiving a first grant scheduling transmission of a first multicast message in accordance with a PTM transmission scheme configuration, the first grant indicating a first feedback process ID for the first multicast message and including a first NDI having a first value. The communications manager 820 may be configured as or otherwise support a means for transmitting feedback for the first multicast message corresponding to the first feedback process ID. The communications manager 820 may be configured as or otherwise support a means for receiving, based on transmitting the feedback, a second grant scheduling transmission of a second message and indicating the first feedback process ID for the second message, the second grant including an indication of one of a UE-specific ID or a group ID and including a second NDI having a second value. The communications manager 820 may be configured as or otherwise support a means for monitoring for the second message in accordance with a PTP transmission scheme configuration or PTM transmission scheme configuration based on the indication and the second NDI.

The actions performed by the communications manager 820, among other examples herein, may be implemented to realize one or more potential advantages. For example, communications manager 820 may increase available battery power and communication quality at a wireless device (e.g., a UE 115) by supporting identification of a transmission as a new transmission or retransmission of a multicast message or unicast message. In some cases, the identification of the transmission may support soft combining data of the transmission with one or more initial transmissions or retransmissions, which may increase communication quality. The increase in communication quality may result in increased link performance and decreased overhead based on identifying the characteristics of the transmission. Accordingly, communications manager 820 may save power and increase battery life at a wireless device (e.g., a UE 115) by strategically increasing a quality of communications at a wireless device (e.g., a UE 115).

Figure 9:
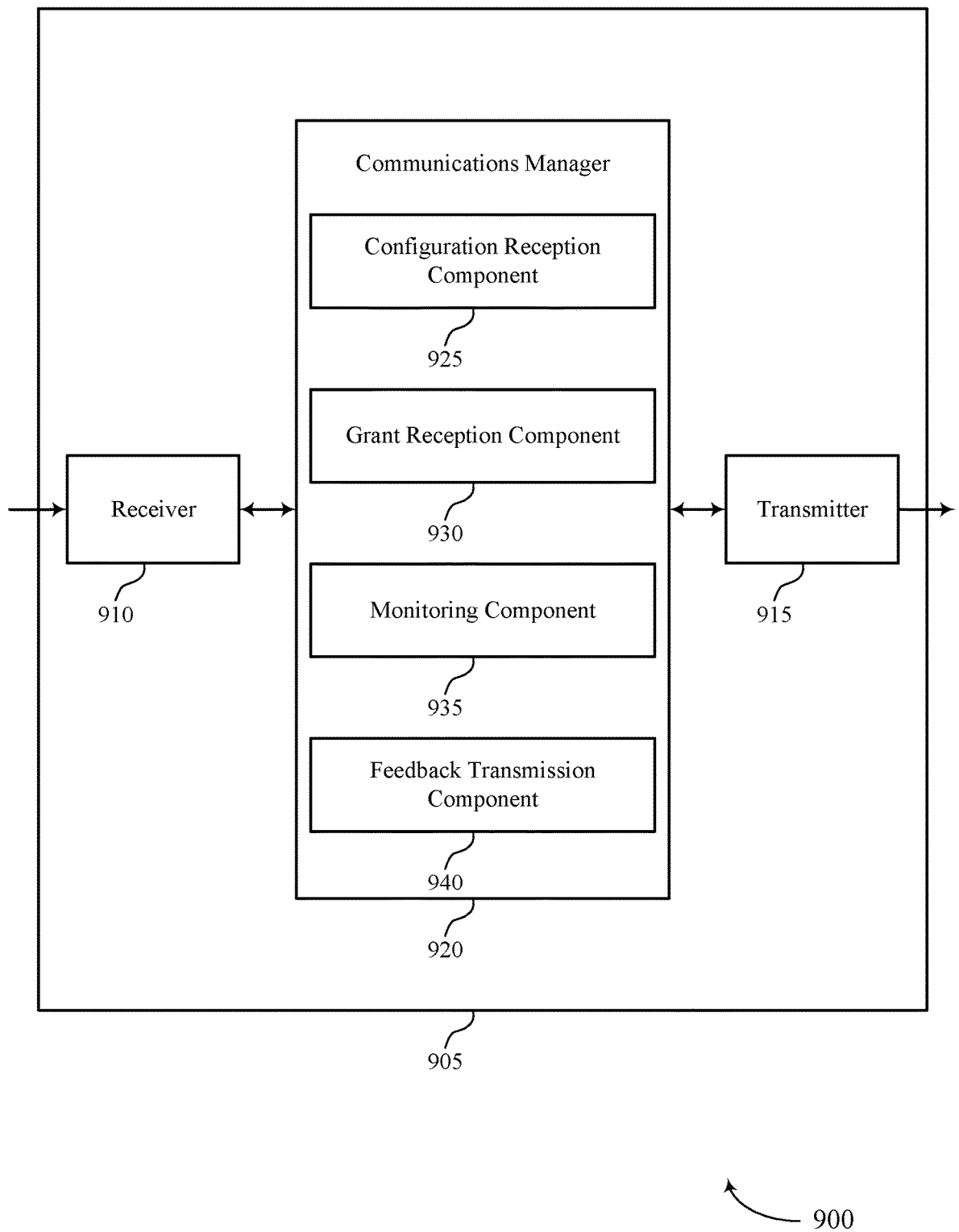

FIG. 9 shows a block diagram 900 of a device 905 in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to feedback techniques for mixed mode transmission schemes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to feedback techniques for mixed mode transmission schemes). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of feedback techniques for mixed mode transmission schemes as described herein. For example, the communications manager 920 may include a configuration reception component 925, a grant reception component 930, a monitoring component 935, a feedback transmission component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. The configuration reception component 925 may be configured as or otherwise support a means for receiving control signaling indicating a set of multiple feedback process IDs, where the set of multiple feedback process IDs includes a first feedback process ID reserved for multicast transmission. The grant reception component 930 may be configured as or otherwise support a means for receiving a grant scheduling a retransmission of a multicast message and indicating a second feedback process ID of the set of multiple feedback process IDs. The monitoring component 935 may be configured as or otherwise support a means for monitoring for the retransmission of the multicast message in accordance with a PTP transmission scheme configuration or a PTM transmission scheme configuration based on the second feedback process ID.

Additionally or alternatively, the communications manager 920 may support wireless communication at a UE in accordance with examples as disclosed herein. The grant reception component 930 may be configured as or otherwise support a means for receiving a first grant scheduling transmission of a first multicast message in accordance with a PTM transmission scheme configuration, the first grant indicating a first feedback process ID for the first multicast message and including a first NDI having a first value. The feedback transmission component 940 may be configured as or otherwise support a means for transmitting feedback for the first multicast message corresponding to the first feedback process ID. The grant reception component 930 may be configured as or otherwise support a means for receiving, based on transmitting the feedback, a second grant scheduling transmission of a second message and indicating the first feedback process ID for the second message, the second grant including an indication of one of a UE-specific ID or a group ID and including a second NDI having a second value. The monitoring component 935 may be configured as or otherwise support a means for monitoring for the second message in accordance with a PTP transmission scheme configuration or PTM transmission scheme configuration based on the indication and the second NDI.

A processor of a wireless device (e.g., controlling the receiver 910, the transmitter 915, or the transceiver 1115 as described with reference to FIG. 11) may increase available battery power and communication quality. The increased communication quality may increase available battery power and throughput (e.g., via implementation of system components described with reference to FIG. 11) compared to other systems and techniques, for example, that do not support identification of a transmission as a new transmission or retransmission of a multicast message or unicast message. Further, the processor of the wireless device may identify one or more aspects of a control message or grant to identify the transmission, which may result in increased communication quality, as well as save power and increase battery life at the wireless device (e.g., by strategically supporting increased communication quality by performing soft combining), among other benefits.

Figure 10:
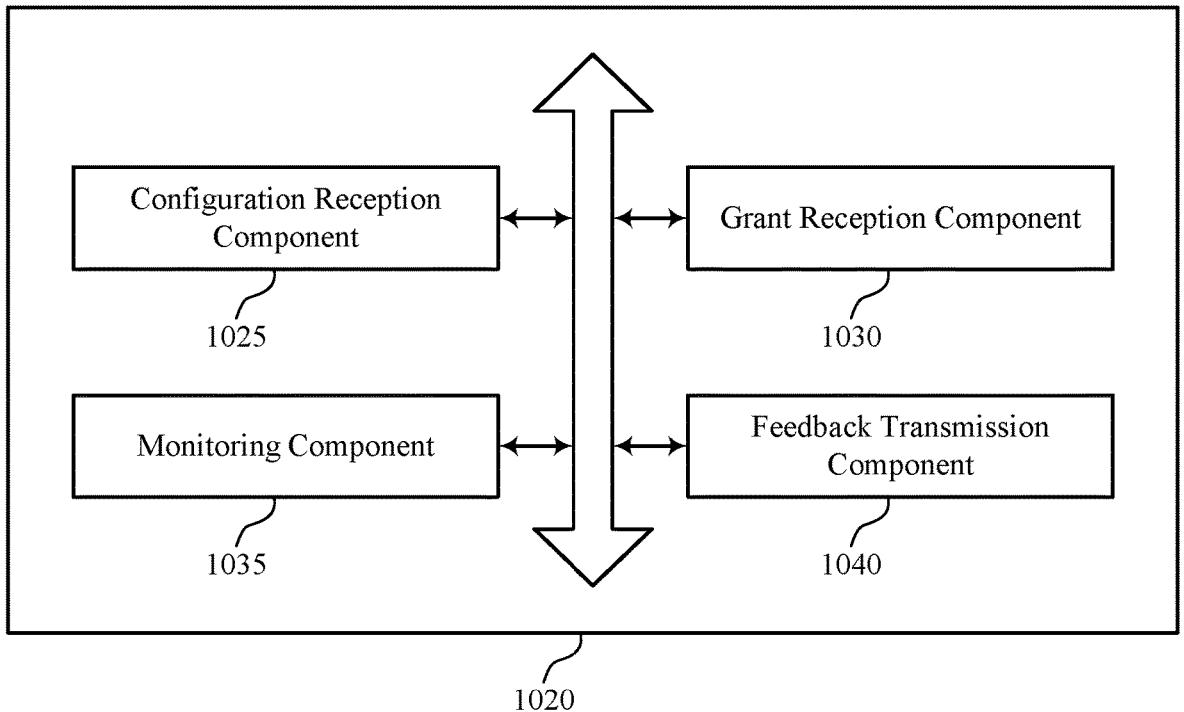
FIG. 10 shows a block diagram of a communications manager in accordance with aspects of the present disclosure.

FIG. 10 shows a block diagram 1000 of a communications manager 1020 in accordance with aspects of the present disclosure. The communications manager 1020 may be an example of aspects of a communications manager 820, a communications manager 920, or both, as described herein. The communications manager 1020, or various components thereof, may be an example of means for performing various aspects of feedback techniques for mixed mode transmission schemes as described herein. For example, the communications manager 1020 may include a configuration reception component 1025, a grant reception component 1030, a monitoring component 1035, a feedback transmission component 1040, or any combination thereof. Each of these components may communicate, directly or indirectly, with one another (e.g., via one or more buses).

The communications manager 1020 may support wireless communication at a UE in accordance with examples as disclosed herein. The configuration reception component 1025 may be configured as or otherwise support a means for receiving control signaling indicating a set of multiple feedback process IDs, where the set of multiple feedback process IDs includes a first feedback process ID reserved for multicast transmission. The grant reception component 1030 may be configured as or otherwise support a means for receiving a grant scheduling a retransmission of a multicast message and indicating a second feedback process ID of the set of multiple feedback process IDs. The monitoring component 1035 may be configured as or otherwise support a means for monitoring for the retransmission of the multicast message in accordance with a PTP transmission scheme configuration or a PTM transmission scheme configuration based on the second feedback process ID.

In some examples, to support monitoring for the retransmission, the monitoring component 1035 may be configured as or otherwise support a means for monitoring for the retransmission of the multicast message in accordance with the PTM transmission scheme configuration based on the second feedback process ID being the same as the first feedback process ID. In some examples, to support monitoring for the retransmission, the monitoring component 1035 may be configured as or otherwise support a means for monitoring for the retransmission of the multicast message in accordance with the PTP transmission scheme configuration based on the second feedback process ID differing from the first feedback process ID.

In some examples, to support receiving the control signaling, the configuration reception component 1025 may be configured as or otherwise support a means for receiving radio resource control signaling indicating that the second feedback process ID of the set of multiple feedback process IDs is useable for unicast transmission. In some examples, to support receiving the control signaling, the configuration reception component 1025 may be configured as or otherwise support a means for receiving radio resource control signaling indicating that the second feedback process ID of the set of multiple feedback process IDs is useable for multicast transmission, unicast transmission, or both.

In some examples, the grant reception component 1030 may be configured as or otherwise support a means for receiving a second grant including the second feedback process ID and scheduling transmission of a second multicast message, the second grant including a bit set scrambled with a group ID and a NDI indicating that the second multicast message includes one of new data or previously transmitted data. In some examples, the monitoring component 1035 may be configured as or otherwise support a means for monitoring for the second multicast message using the PTM transmission scheme configuration based on the second grant including the bit set scrambled with the group ID.

In some examples, the grant reception component 1030 may be configured as or otherwise support a means for receiving a second grant including the second feedback process ID and scheduling transmission of a second message, the second grant including a bit set scrambled with a UE-specific ID and a NDI indicating that the second message includes one of new data or previously transmitted data. In some examples, the monitoring component 1035 may be configured as or otherwise support a means for monitoring for the second message using the PTP transmission scheme configuration based on the second grant including the bit set scrambled with the UE-specific ID.

In some examples, the grant reception component 1030 may be configured as or otherwise support a means for receiving the second grant including a bit field. In some examples, the monitoring component 1035 may be configured as or otherwise support a means for monitoring for the second message that is a multicast retransmission based on the bit field. In some examples, the grant reception component 1030 may be configured as or otherwise support a means for receiving the second grant including a bit field. In some examples, the monitoring component 1035 may be configured as or otherwise support a means for monitoring for the second message that is a unicast new transmission based on the NDI.

In some examples, the grant reception component 1030 may be configured as or otherwise support a means for receiving the second grant including a bit field. In some examples, the monitoring component 1035 may be configured as or otherwise support a means for monitoring for the second message that is a unicast retransmission based on the bit field.

Additionally or alternatively, the communications manager 1020 may support wireless communication at a UE in accordance with examples as disclosed herein. In some examples, the grant reception component 1030 may be configured as or otherwise support a means for receiving a first grant scheduling transmission of a first multicast message in accordance with a PTM transmission scheme configuration, the first grant indicating a first feedback process ID for the first multicast message and including a first NDI having a first value. The feedback transmission component 1040 may be configured as or otherwise support a means for transmitting feedback for the first multicast message corresponding to the first feedback process ID.

In some examples, the grant reception component 1030 may be configured as or otherwise support a means for receiving, based on transmitting the feedback, a second grant scheduling transmission of a second message and indicating the first feedback process ID for the second message, the second grant including an indication of one of a UE-specific ID or a group ID and including a second NDI having a second value. In some examples, the monitoring component 1035 may be configured as or otherwise support a means for monitoring for the second message in accordance with a PTP transmission scheme configuration or PTM transmission scheme configuration based on the indication and the second NDI.

In some examples, the grant reception component 1030 may be configured as or otherwise support a means for receiving a third grant scheduling transmission of a third message and including a bit field scrambled by the group ID. In some examples, the monitoring component 1035 may be configured as or otherwise support a means for monitoring for the third message that is a new transmission based on the second message being transmitted in accordance with the PTP transmission scheme configuration transmission scheme and the third grant including the bit field scrambled by the group ID.

In some examples, the grant reception component 1030 may be configured as or otherwise support a means for receiving the second grant including a bit field scrambled by the UE-specific ID. In some examples, the monitoring component 1035 may be configured as or otherwise support a means for monitoring for the second message that is a new transmission in accordance with the PTP transmission scheme configuration based on the bit field being scrambled with the UE-specific ID and the second value being different than the first value.

In some examples, the grant reception component 1030 may be configured as or otherwise support a means for receiving a third grant scheduling transmission of a third message, the third grant including a bit field scrambled by the UE-specific ID and a third NDI having the second value. In some examples, the monitoring component 1035 may be configured as or otherwise support a means for monitoring for the third message that is a retransmission of the second message in accordance with the PTP transmission scheme configuration based on the bit field being scrambled with the UE-specific ID and the third NDI having the second value. In some examples, the third grant includes a cast indicator bit field and the monitoring component 1035 may be configured as or otherwise support a means for monitoring for the third message that is a retransmission of the second message based on the cast indicator bit field having a value indicating unicast.

In some examples, the grant reception component 1030 may be configured as or otherwise support a means for receiving the second grant including a bit field scrambled by the UE-specific ID. In some examples, the monitoring component 1035 may be configured as or otherwise support a means for monitoring for the second message that is a retransmission of the first multicast message in accordance with the PTP transmission scheme configuration based on the bit field being scrambled with the UE-specific ID and the second value being the same as the first value. In some examples, the second grant includes a cast indicator bit field and the monitoring component 1035 may be configured as or otherwise support a means for monitoring for the second message that is a retransmission of the first multicast message based on the cast indicator bit field having a value indicating multicast.

In some examples, the grant reception component 1030 may be configured as or otherwise support a means for receiving the second grant including a bit field scrambled by the group ID. In some examples, the monitoring component 1035 may be configured as or otherwise support a means for monitoring for the second message that is a new transmission in accordance with the PTM transmission scheme configuration based on the bit field being scrambled with the group ID and the second value being different than the first value.

In some examples, the grant reception component 1030 may be configured as or otherwise support a means for receiving the second grant including a bit field scrambled by the group ID. In some examples, the monitoring component 1035 may be configured as or otherwise support a means for monitoring for the second message that is a retransmission of the first multicast message in accordance with the PTM transmission scheme configuration based on the bit field being scrambled with the group ID and the second value being the same as the first value.

Figure 11:
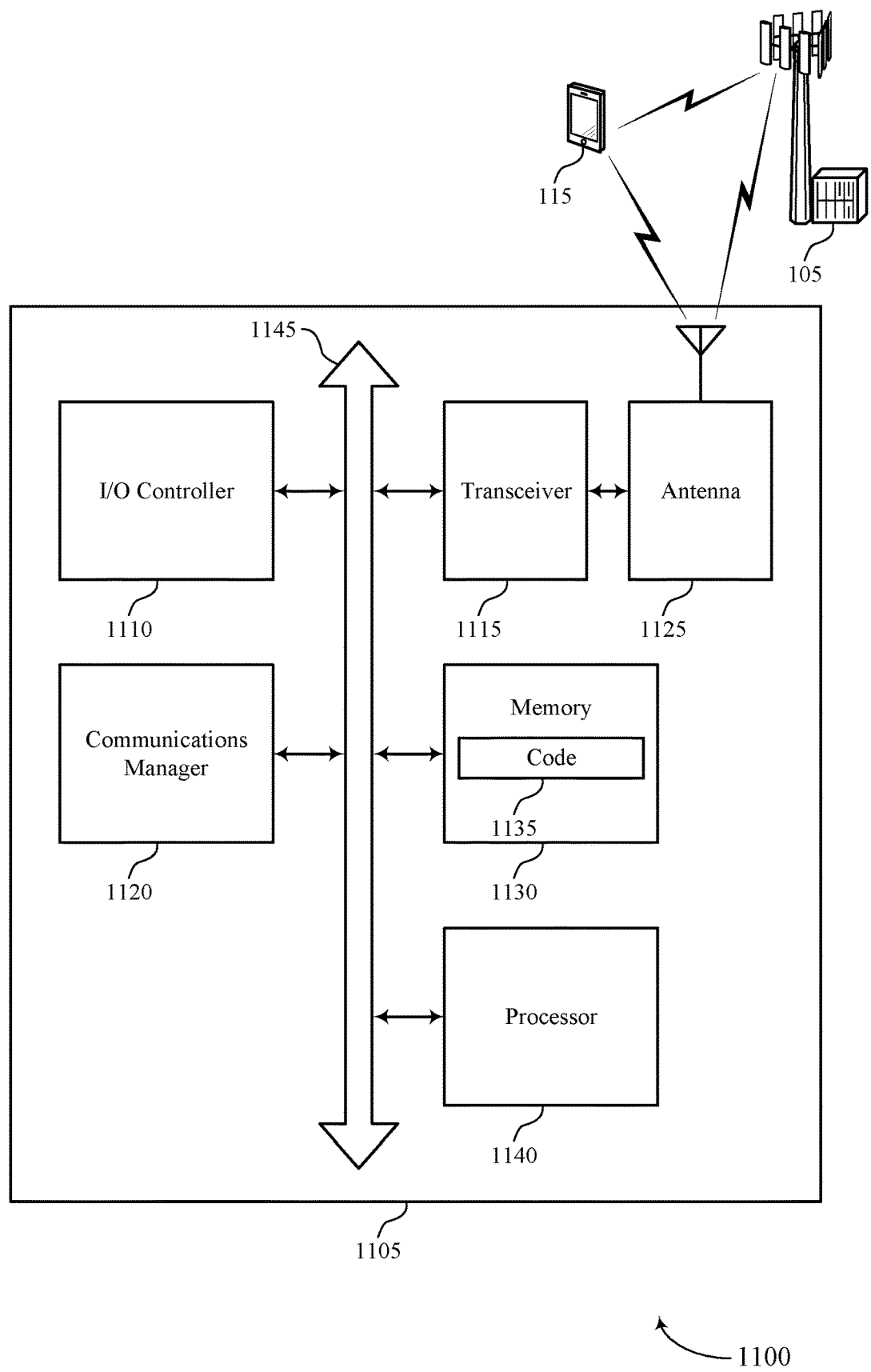
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting feedback techniques for mixed mode transmission schemes). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a UE in accordance with examples as disclosed herein. For example, the communications manager 1120 may be configured as or otherwise support a means for receiving control signaling indicating a set of multiple feedback process IDs, where the set of multiple feedback process IDs includes a first feedback process ID reserved for multicast transmission. The communications manager 1120 may be configured as or otherwise support a means for receiving a grant scheduling a retransmission of a multicast message and indicating a second feedback process ID of the set of multiple feedback process IDs. The communications manager 1120 may be configured as or otherwise support a means for monitoring for the retransmission of the multicast message in accordance with a PTP transmission scheme configuration or a PTM transmission scheme configuration based on the second feedback process ID.

Additionally or alternatively, the communications manager 1120 may support wireless communication at a UE in accordance with examples as disclosed herein. For example, the communications manager 1120 may be configured as or otherwise support a means for receiving a first grant scheduling transmission of a first multicast message in accordance with a PTM transmission scheme configuration, the first grant indicating a first feedback process ID for the first multicast message and including a first NDI having a first value. The communications manager 1120 may be configured as or otherwise support a means for transmitting feedback for the first multicast message corresponding to the first feedback process ID. The communications manager 1120 may be configured as or otherwise support a means for receiving, based on transmitting the feedback, a second grant scheduling transmission of a second message and indicating the first feedback process ID for the second message, the second grant including an indication of one of a UE-specific ID or a group ID and including a second NDI having a second value. The communications manager 1120 may be configured as or otherwise support a means for monitoring for the second message in accordance with a PTP transmission scheme configuration or PTM transmission scheme configuration based on the indication and the second NDI.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of feedback techniques for mixed mode transmission schemes as described herein, or the processor 1140 and the memory 1130 may be otherwise configured to perform or support such operations.

Figure 12:
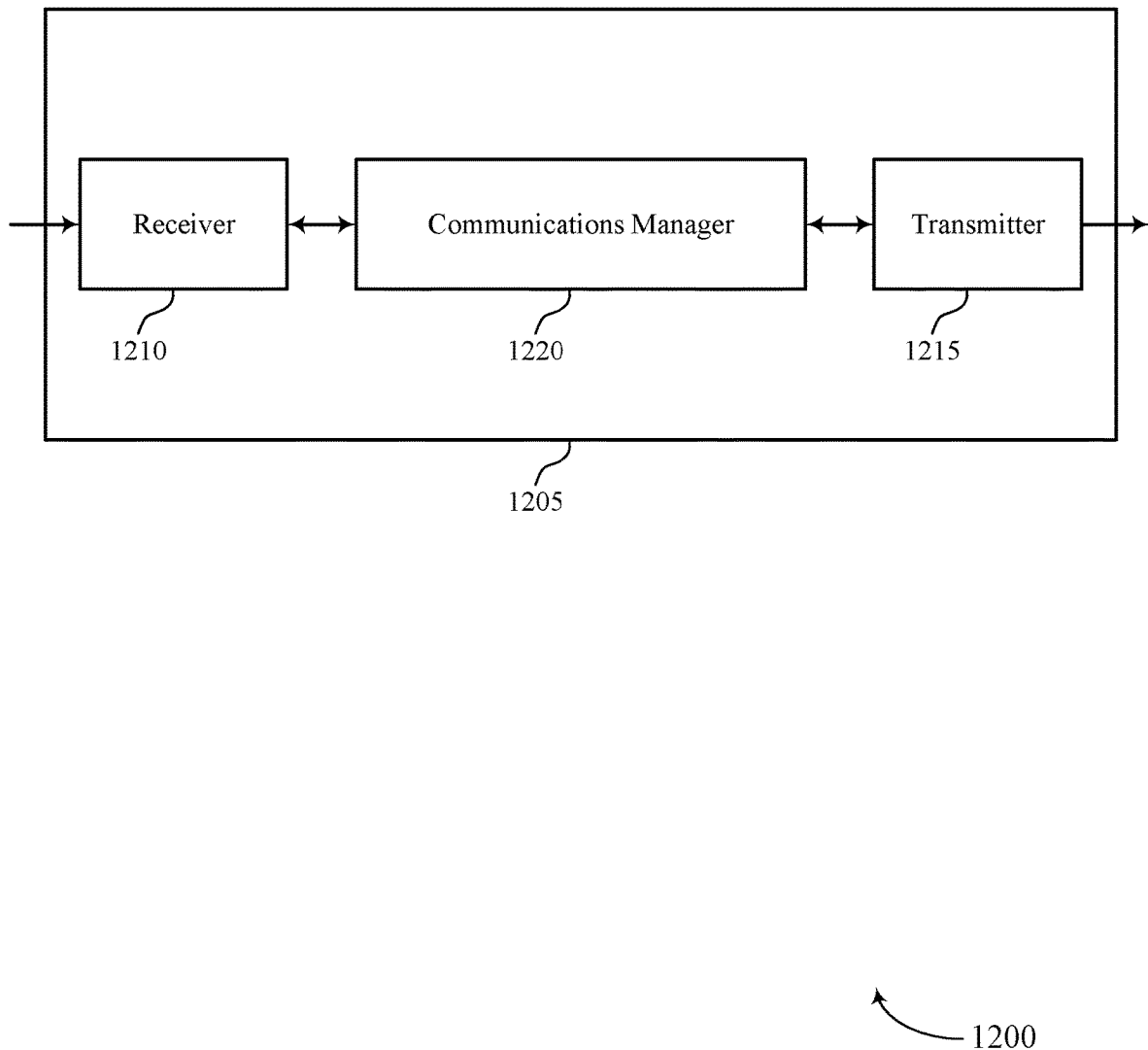
FIGS. 12 and 13 show block diagrams of devices in accordance with aspects of the present disclosure.

FIG. 12 shows a block diagram 1200 of a device 1205 in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to feedback techniques for mixed mode transmission schemes). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to feedback techniques for mixed mode transmission schemes). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of feedback techniques for mixed mode transmission schemes as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, control signaling indicating a set of multiple feedback process IDs, where the set of multiple feedback process IDs includes a first feedback process ID reserved for multicast transmission. The communications manager 1220 may be configured as or otherwise support a means for transmitting a grant scheduling a retransmission of a multicast message and indicating a second feedback process ID of the set of multiple feedback process IDs. The communications manager 1220 may be configured as or otherwise support a means for transmitting a retransmission of the multicast message in accordance with a PTP transmission scheme configuration or a PTM transmission scheme configuration based on the second feedback process ID.

Additionally or alternatively, the communications manager 1220 may support wireless communication at a base station in accordance with examples as disclosed herein. For example, the communications manager 1220 may be configured as or otherwise support a means for transmitting, to a UE, a first grant scheduling transmission of a first multicast message in accordance with a PTM transmission scheme configuration, the first grant indicating a first feedback process ID for the first multicast message and including a first NDI having a first value. The communications manager 1220 may be configured as or otherwise support a means for receiving feedback for the first multicast message corresponding to the first feedback process ID. The communications manager 1220 may be configured as or otherwise support a means for transmitting, based on receiving the feedback, a second grant scheduling transmission of a second message and indicating the first feedback process ID for the second message, the second grant including an indication of one of a UE-specific ID or a group ID and including a second NDI having a second value. The communications manager 1220 may be configured as or otherwise support a means for transmitting the second message in accordance with a PTP transmission scheme configuration or PTM transmission scheme configuration based on the indication and the second NDI.

Figure 13:
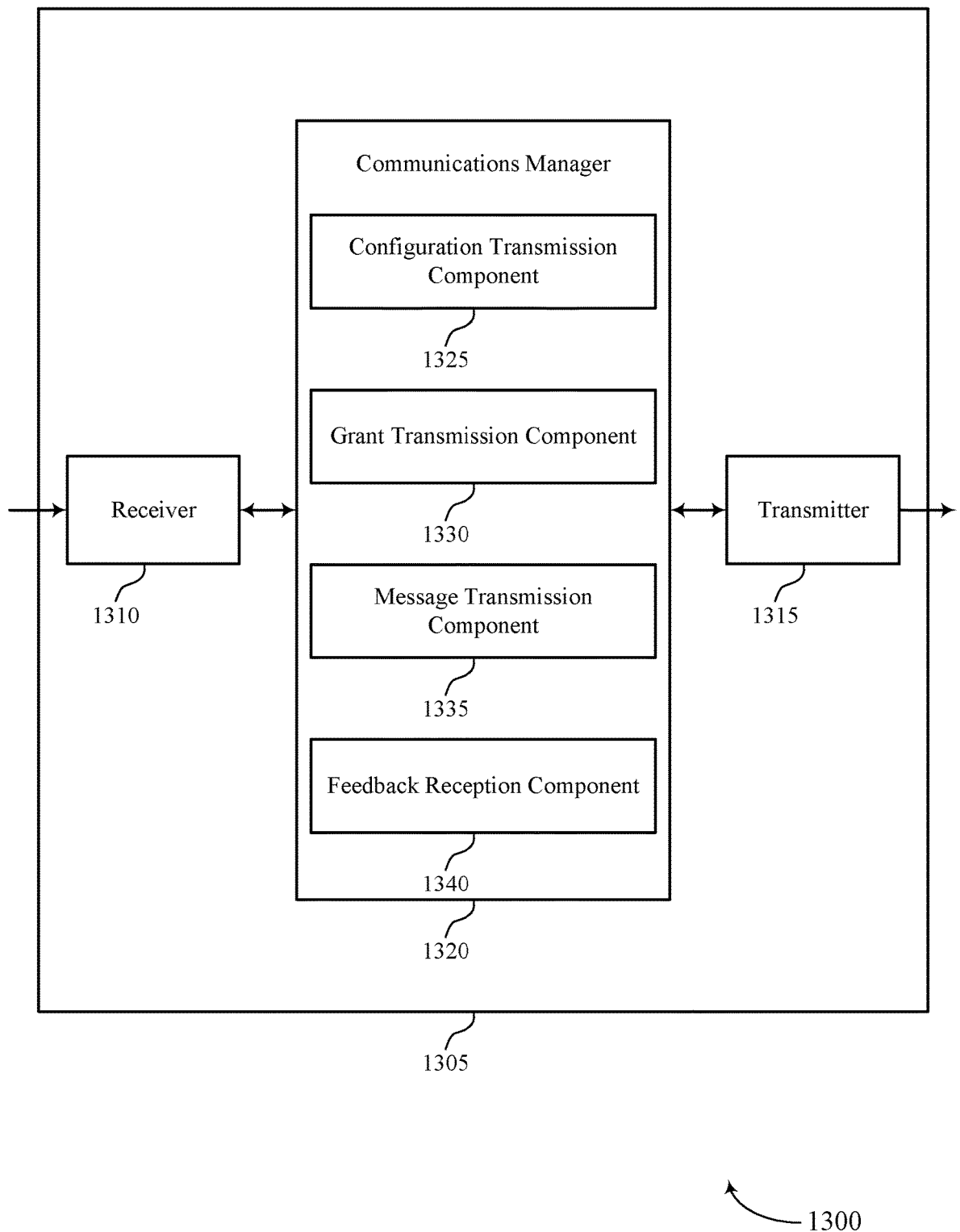

FIG. 13 shows a block diagram 1300 of a device 1305 in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to feedback techniques for mixed mode transmission schemes). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to feedback techniques for mixed mode transmission schemes). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of feedback techniques for mixed mode transmission schemes as described herein. For example, the communications manager 1320 may include a configuration transmission component 1325, a grant transmission component 1330, a message transmission component 1335, a feedback reception component 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The configuration transmission component 1325 may be configured as or otherwise support a means for transmitting, to a UE, control signaling indicating a set of multiple feedback process IDs, where the set of multiple feedback process IDs includes a first feedback process ID reserved for multicast transmission. The grant transmission component 1330 may be configured as or otherwise support a means for transmitting a grant scheduling a retransmission of a multicast message and indicating a second feedback process ID of the set of multiple feedback process IDs. The message transmission component 1335 may be configured as or otherwise support a means for transmitting a retransmission of the multicast message in accordance with a PTP transmission scheme configuration or a PTM transmission scheme configuration based on the second feedback process ID.

Additionally or alternatively, the communications manager 1320 may support wireless communication at a base station in accordance with examples as disclosed herein. The grant transmission component 1330 may be configured as or otherwise support a means for transmitting, to a UE, a first grant scheduling transmission of a first multicast message in accordance with a PTM transmission scheme configuration, the first grant indicating a first feedback process ID for the first multicast message and including a first NDI having a first value. The feedback reception component 1340 may be configured as or otherwise support a means for receiving feedback for the first multicast message corresponding to the first feedback process ID. The grant transmission component 1330 may be configured as or otherwise support a means for transmitting, based on receiving the feedback, a second grant scheduling transmission of a second message and indicating the first feedback process ID for the second message, the second grant including an indication of one of a UE-specific ID or a group ID and including a second NDI having a second value. The message transmission component 1335 may be configured as or otherwise support a means for transmitting the second message in accordance with a PTP transmission scheme configuration or PTM transmission scheme configuration based on the indication and the second NDI.

Figure 14:
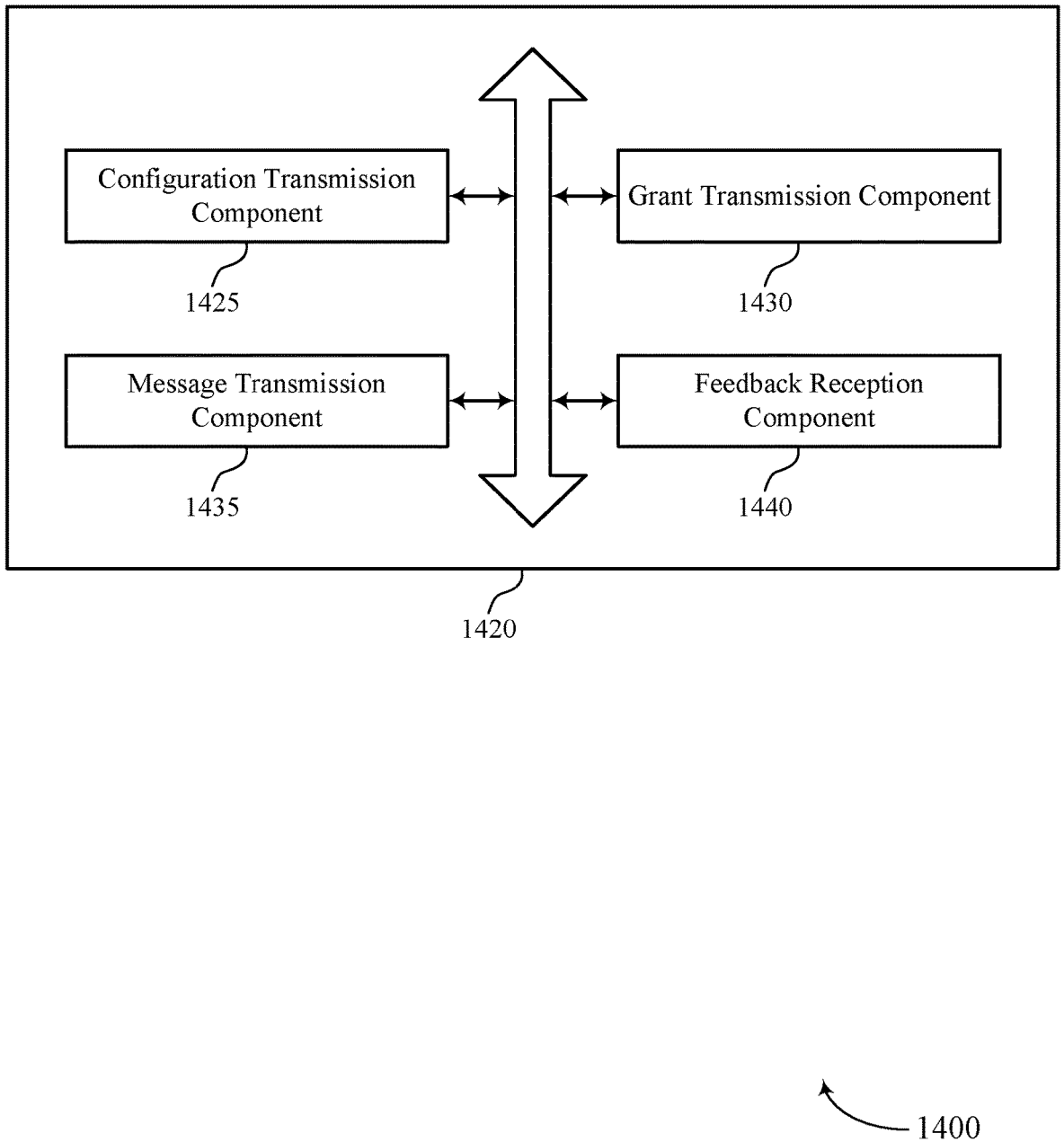
FIG. 14 shows a block diagram of a communications manager in accordance with aspects of the present disclosure.

FIG. 14 shows a block diagram 1400 of a communications manager 1420 in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of feedback techniques for mixed mode transmission schemes as described herein. For example, the communications manager 1420 may include a configuration transmission component 1425, a grant transmission component 1430, a message transmission component 1435, a feedback reception component 1440, or any combination thereof. Each of these components may communicate, directly or indirectly, with one another (e.g., via one or more buses).

The communications manager 1420 may support wireless communication at a base station in accordance with examples as disclosed herein. The configuration transmission component 1425 may be configured as or otherwise support a means for transmitting, to a UE, control signaling indicating a set of multiple feedback process IDs, where the set of multiple feedback process IDs includes a first feedback process ID reserved for multicast transmission. The grant transmission component 1430 may be configured as or otherwise support a means for transmitting a grant scheduling a retransmission of a multicast message and indicating a second feedback process ID of the set of multiple feedback process IDs. The message transmission component 1435 may be configured as or otherwise support a means for transmitting a retransmission of the multicast message in accordance with a PTP transmission scheme configuration or a PTM transmission scheme configuration based on the second feedback process ID.

In some examples, to support transmitting the retransmission of the multicast message, the message transmission component 1435 may be configured as or otherwise support a means for transmitting the retransmission of the multicast message in accordance with the PTM transmission scheme configuration based on the second feedback process ID being the same as the first feedback process ID. In some examples, to support transmitting the retransmission of the multicast message, the message transmission component 1435 may be configured as or otherwise support a means for transmitting the retransmission of the multicast message in accordance with the PTP transmission scheme configuration based on the second feedback process ID differing from the first feedback process ID.

In some examples, the grant transmission component 1430 may be configured as or otherwise support a means for transmitting a second grant including the second feedback process ID and scheduling transmission of a second message, the second grant including a bit set scrambled with a UE-specific ID, a NDI indicating that the second message includes previously transmitted data, and a bit field. In some examples, the message transmission component 1435 may be configured as or otherwise support a means for transmitting the second message that is a multicast retransmission based on the bit field.

In some examples, the grant transmission component 1430 may be configured as or otherwise support a means for transmitting a second grant including the second feedback process ID and scheduling transmission of a second message, the second grant including a bit set scrambled with a UE-specific ID, a NDI indicating that the second message includes a new transmission, and a bit field. In some examples, the message transmission component 1435 may be configured as or otherwise support a means for transmitting the second message that is a new transmission based on the NDI.

In some examples, the grant transmission component 1430 may be configured as or otherwise support a means for transmitting a second grant including the second feedback process ID and scheduling transmission of a second message, the second grant including a bit set scrambled with a UE-specific ID, a NDI indicating that the second message includes previously transmitted data, and a bit field. In some examples, the message transmission component 1435 may be configured as or otherwise support a means for transmitting the second message that is a unicast retransmission based on the bit field.

Additionally or alternatively, the communications manager 1420 may support wireless communication at a base station in accordance with examples as disclosed herein. In some examples, the grant transmission component 1430 may be configured as or otherwise support a means for transmitting, to a UE, a first grant scheduling transmission of a first multicast message in accordance with a PTM transmission scheme configuration, the first grant indicating a first feedback process ID for the first multicast message and including a first NDI having a first value. The feedback reception component 1440 may be configured as or otherwise support a means for receiving feedback for the first multicast message corresponding to the first feedback process ID. In some examples, the grant transmission component 1430 may be configured as or otherwise support a means for transmitting, based on receiving the feedback, a second grant scheduling transmission of a second message and indicating the first feedback process ID for the second message, the second grant including an indication of one of a UE-specific ID or a group ID and including a second NDI having a second value. In some examples, the message transmission component 1435 may be configured as or otherwise support a means for transmitting the second message in accordance with a PTP transmission scheme configuration or PTM transmission scheme configuration based on the indication and the second NDI.

In some examples, the grant transmission component 1430 may be configured as or otherwise support a means for transmitting a third grant scheduling transmission of a third message and including a bit field scrambled by the group ID. In some examples, the message transmission component 1435 may be configured as or otherwise support a means for transmitting the third message that is a new transmission based on the second message being transmitted in accordance with the PTP transmission scheme configuration transmission scheme and the third grant including the bit field scrambled by the group ID.

In some examples, the grant transmission component 1430 may be configured as or otherwise support a means for transmitting the second grant including a bit field scrambled by the UE-specific ID. In some examples, the message transmission component 1435 may be configured as or otherwise support a means for transmitting the second message that is a new transmission in accordance with the PTP transmission scheme configuration based on the bit field being scrambled with the UE-specific ID and the second value being different than the first value.

In some examples, the grant transmission component 1430 may be configured as or otherwise support a means for transmitting a third grant scheduling transmission of a third message, the third grant including a bit field scrambled by the UE-specific ID, a third NDI having the second value, and a cast indicator bit field. In some examples, the message transmission component 1435 may be configured as or otherwise support a means for transmitting the third message that is a retransmission of the second message in accordance with the PTP transmission scheme configuration based on the bit field being scrambled with the UE-specific ID, the third NDI having the second value, and the cast indicator bit field having a value indicating unicast.

In some examples, the grant transmission component 1430 may be configured as or otherwise support a means for transmitting the second grant including a bit field scrambled by the UE-specific ID and a cast indicator bit field. In some examples, the message transmission component 1435 may be configured as or otherwise support a means for transmitting the second message that is a retransmission of the first multicast message in accordance with the PTP transmission scheme configuration based on the bit field being scrambled with the UE-specific ID, the second value being the same as the first value, and the cast indicator bit field having a value indicating multicast.

Figure 15:
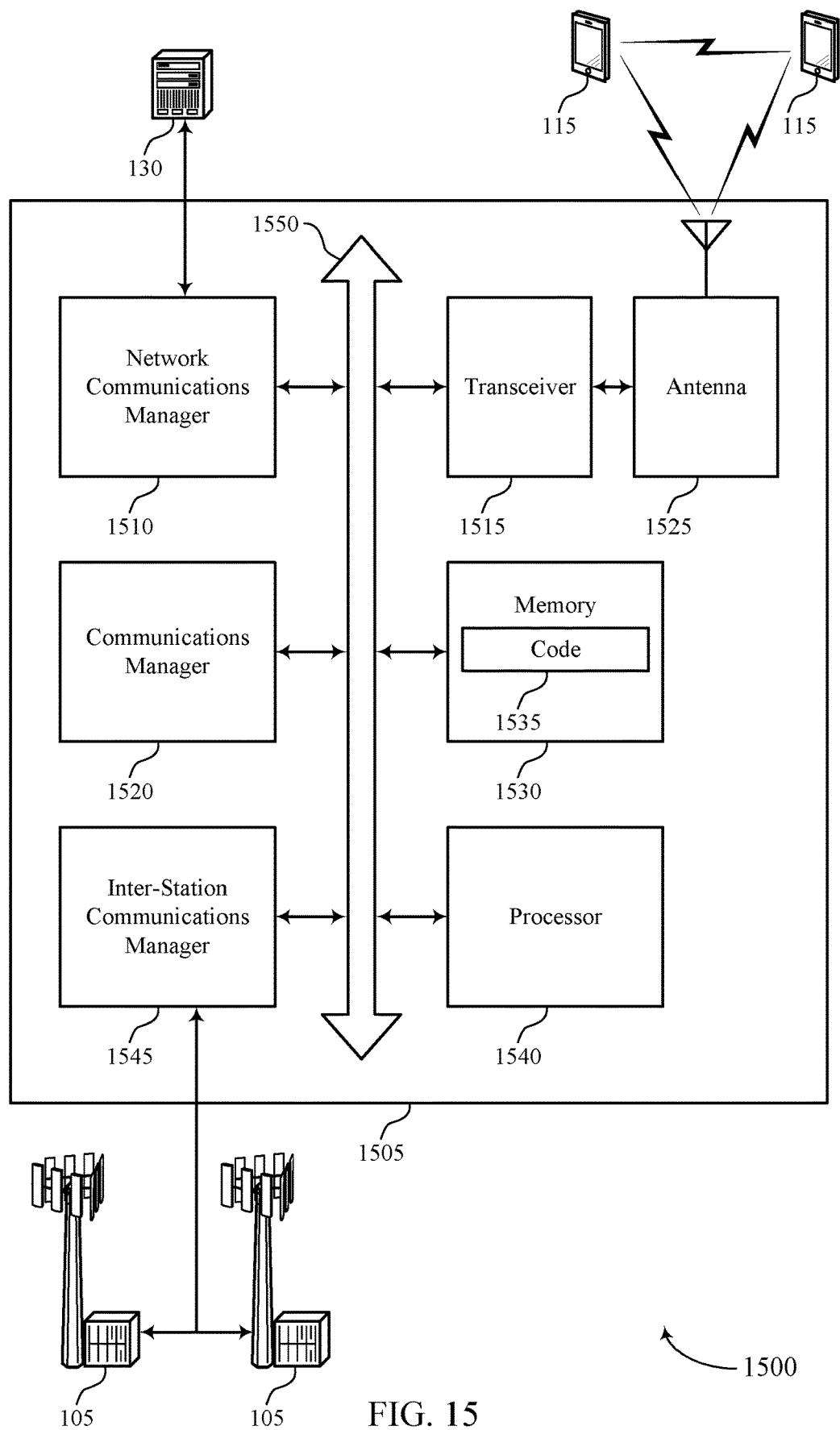
FIG. 15 shows a diagram of a system including a device in accordance with aspects of the present disclosure.

FIG. 15 shows a diagram of a system 1500 including a device 1505 in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting feedback techniques for mixed mode transmission schemes). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, control signaling indicating a set of multiple feedback process IDs, where the set of multiple feedback process IDs includes a first feedback process ID reserved for multicast transmission. The communications manager 1520 may be configured as or otherwise support a means for transmitting a grant scheduling a retransmission of a multicast message and indicating a second feedback process ID of the set of multiple feedback process IDs. The communications manager 1520 may be configured as or otherwise support a means for transmitting a retransmission of the multicast message in accordance with a PTP transmission scheme configuration or a PTM transmission scheme configuration based on the second feedback process ID.

Additionally or alternatively, the communications manager 1520 may support wireless communication at a base station in accordance with examples as disclosed herein. For example, the communications manager 1520 may be configured as or otherwise support a means for transmitting, to a UE, a first grant scheduling transmission of a first multicast message in accordance with a PTM transmission scheme configuration, the first grant indicating a first feedback process ID for the first multicast message and including a first NDI having a first value. The communications manager 1520 may be configured as or otherwise support a means for receiving feedback for the first multicast message corresponding to the first feedback process ID. The communications manager 1520 may be configured as or otherwise support a means for transmitting, based on receiving the feedback, a second grant scheduling transmission of a second message and indicating the first feedback process ID for the second message, the second grant including an indication of one of a UE-specific ID or a group ID and including a second NDI having a second value. The communications manager 1520 may be configured as or otherwise support a means for transmitting the second message in accordance with a PTP transmission scheme configuration or PTM transmission scheme configuration based on the indication and the second NDI.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of feedback techniques for mixed mode transmission schemes as described herein, or the processor 1540 and the memory 1530 may be otherwise configured to perform or support such operations.

Figure 16:
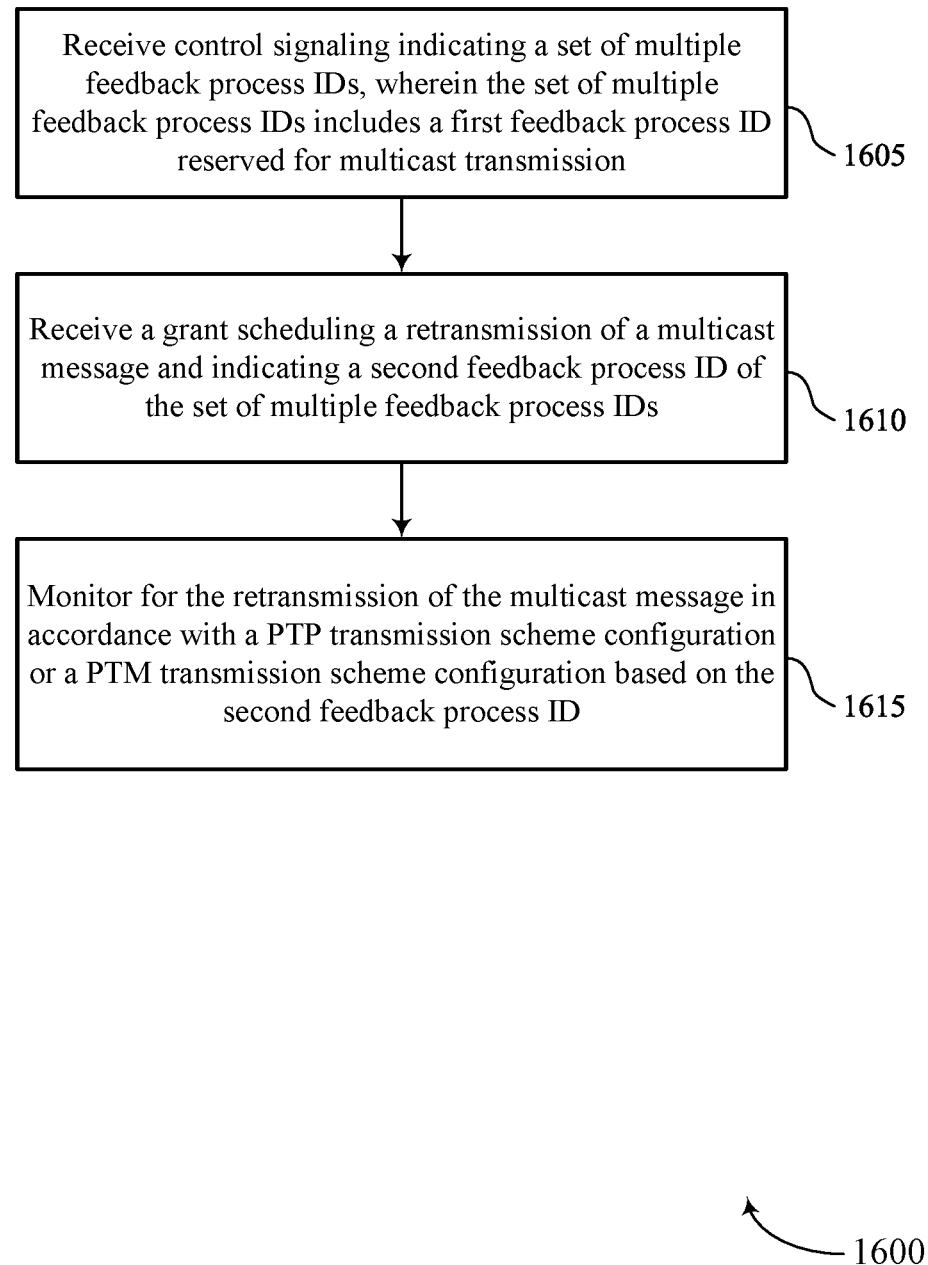
FIGS. 16 through 19 show flowcharts illustrating methods that support feedback techniques for mixed mode transmission schemes in accordance with aspects of the present disclosure.

FIG. 16 shows a flowchart illustrating a method 1600 in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving control signaling indicating a set of multiple feedback process IDs, where the set of multiple feedback process IDs includes a first feedback process ID reserved for multicast transmission. The operations of 1605 may be performed in accordance with examples as disclosed herein. In some examples, aspects of the operations of 1605 may be performed by a configuration reception component 1025 as described with reference to FIG. 10.

At 1610, the method may include receiving a grant scheduling a retransmission of a multicast message and indicating a second feedback process ID of the set of multiple feedback process IDs. The operations of 1610 may be performed in accordance with examples as disclosed herein. In some examples, aspects of the operations of 1610 may be performed by a grant reception component 1030 as described with reference to FIG. 10.

At 1615, the method may include monitoring for the retransmission of the multicast message in accordance with a PTP transmission scheme configuration or a PTM transmission scheme configuration based on the second feedback process ID. The operations of 1615 may be performed in accordance with examples as disclosed herein. In some examples, aspects of the operations of 1615 may be performed by a monitoring component 1035 as described with reference to FIG. 10.

Figure 17:
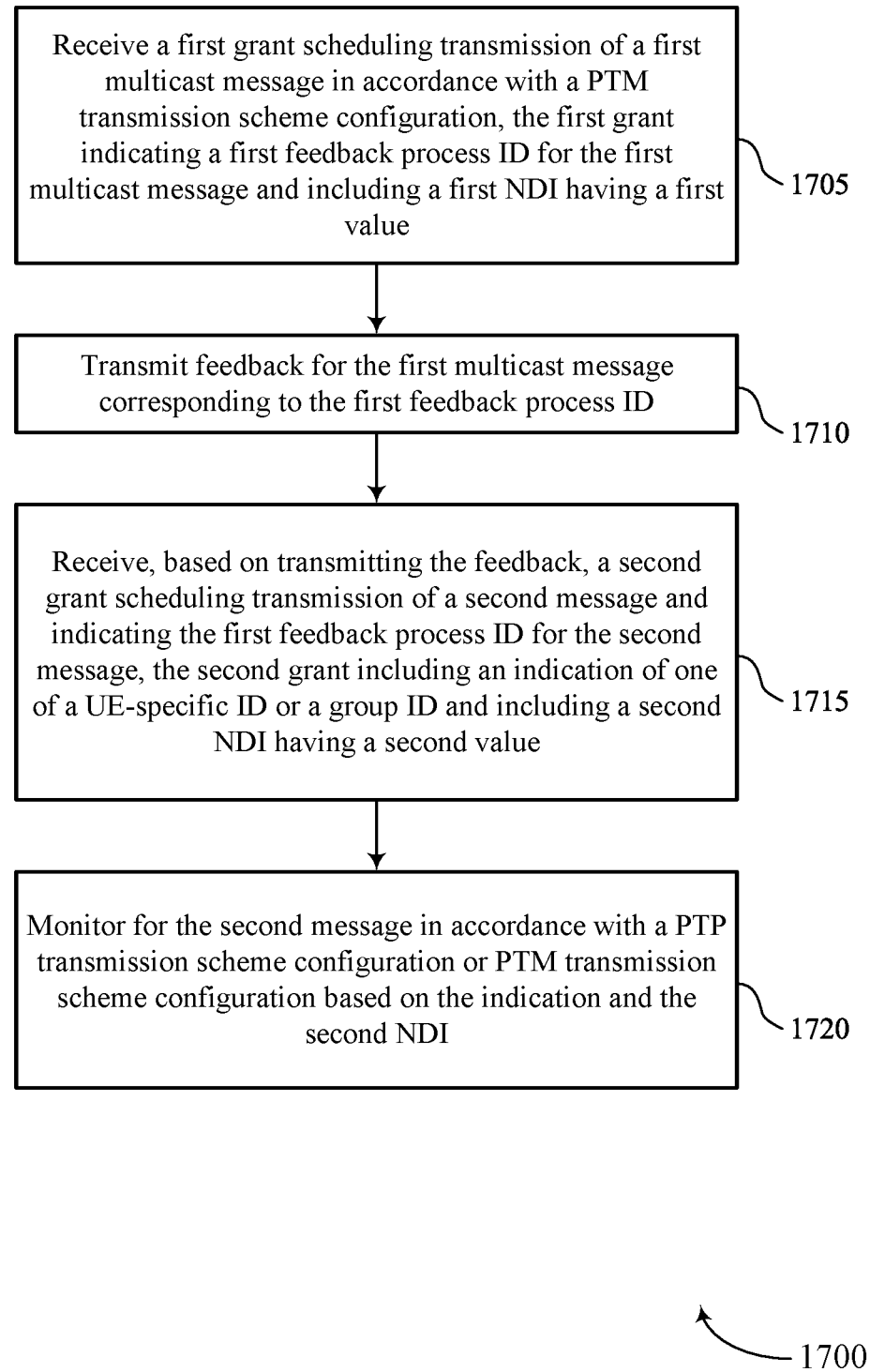

FIG. 17 shows a flowchart illustrating a method 1700 in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving a first grant scheduling transmission of a first multicast message in accordance with a PTM transmission scheme configuration, the first grant indicating a first feedback process ID for the first multicast message and including a first NDI having a first value. The operations of 1705 may be performed in accordance with examples as disclosed herein. In some examples, aspects of the operations of 1705 may be performed by a grant reception component 1030 as described with reference to FIG. 10.

At 1710, the method may include transmitting feedback for the first multicast message corresponding to the first feedback process ID. The operations of 1710 may be performed in accordance with examples as disclosed herein. In some examples, aspects of the operations of 1710 may be performed by a feedback transmission component 1040 as described with reference to FIG. 10.

At 1715, the method may include receiving, based on transmitting the feedback, a second grant scheduling transmission of a second message and indicating the first feedback process ID for the second message, the second grant including an indication of one of a UE-specific ID or a group ID and including a second NDI having a second value. The operations of 1715 may be performed in accordance with examples as disclosed herein. In some examples, aspects of the operations of 1715 may be performed by a grant reception component 1030 as described with reference to FIG. 10.

At 1720, the method may include monitoring for the second message in accordance with a PTP transmission scheme configuration or PTM transmission scheme configuration based on the indication and the second NDI. The operations of 1720 may be performed in accordance with examples as disclosed herein. In some examples, aspects of the operations of 1720 may be performed by a monitoring component 1035 as described with reference to FIG. 10.

Figure 18:
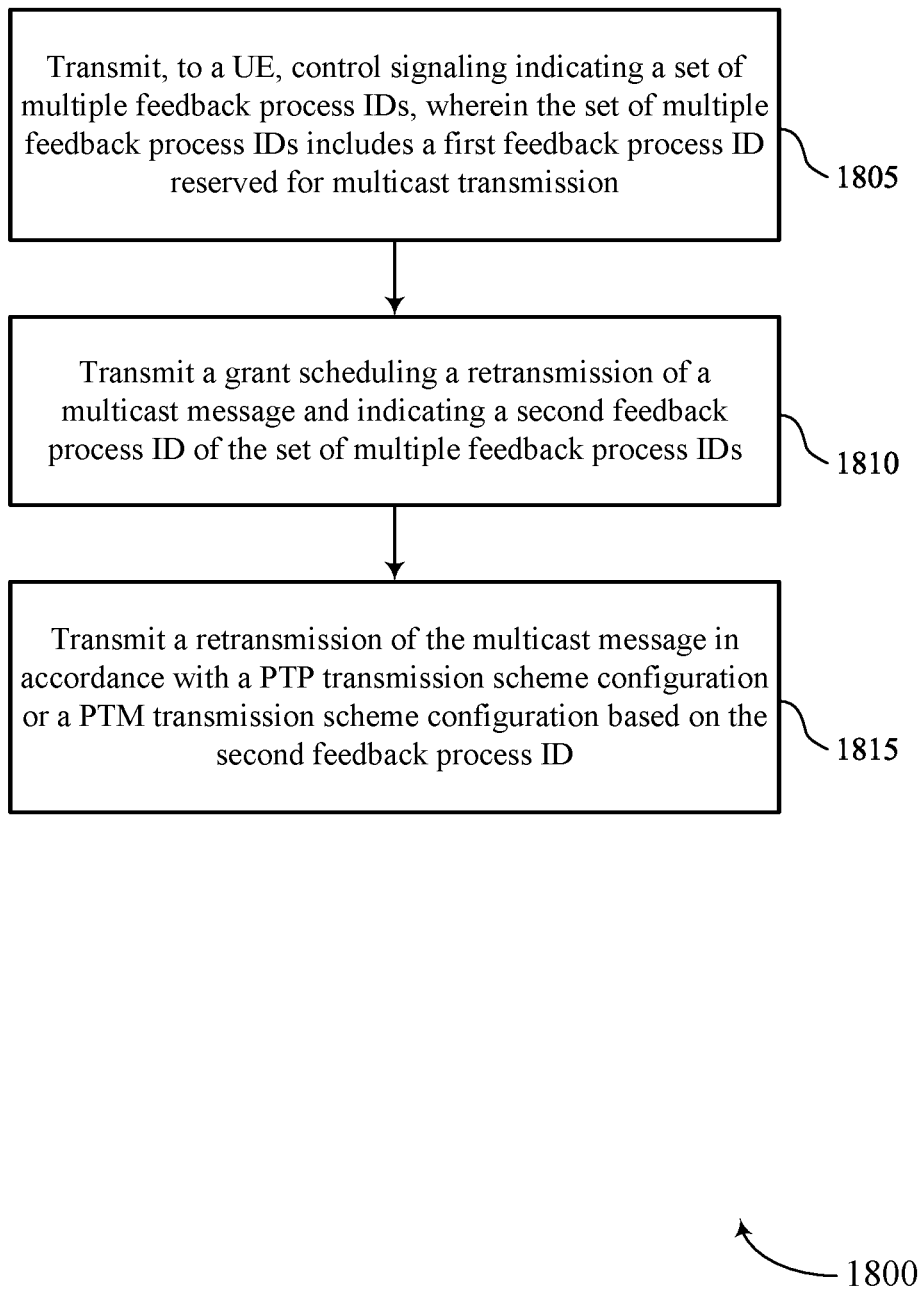

FIG. 18 shows a flowchart illustrating a method 1800 in accordance with aspects of the present disclosure. The operations of the method 1800 may be implemented by a base station or its components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling indicating a set of multiple feedback process IDs, where the set of multiple feedback process IDs includes a first feedback process ID reserved for multicast transmission. The operations of 1805 may be performed in accordance with examples as disclosed herein. In some examples, aspects of the operations of 1805 may be performed by a configuration transmission component 1425 as described with reference to FIG. 14.

At 1810, the method may include transmitting a grant scheduling a retransmission of a multicast message and indicating a second feedback process ID of the set of multiple feedback process IDs. The operations of 1810 may be performed in accordance with examples as disclosed herein. In some examples, aspects of the operations of 1810 may be performed by a grant transmission component 1430 as described with reference to FIG. 14.

At 1815, the method may include transmitting a retransmission of the multicast message in accordance with a PTP transmission scheme configuration or a PTM transmission scheme configuration based on the second feedback process ID. The operations of 1815 may be performed in accordance with examples as disclosed herein. In some examples, aspects of the operations of 1815 may be performed by a message transmission component 1435 as described with reference to FIG. 14.

Figure 19:
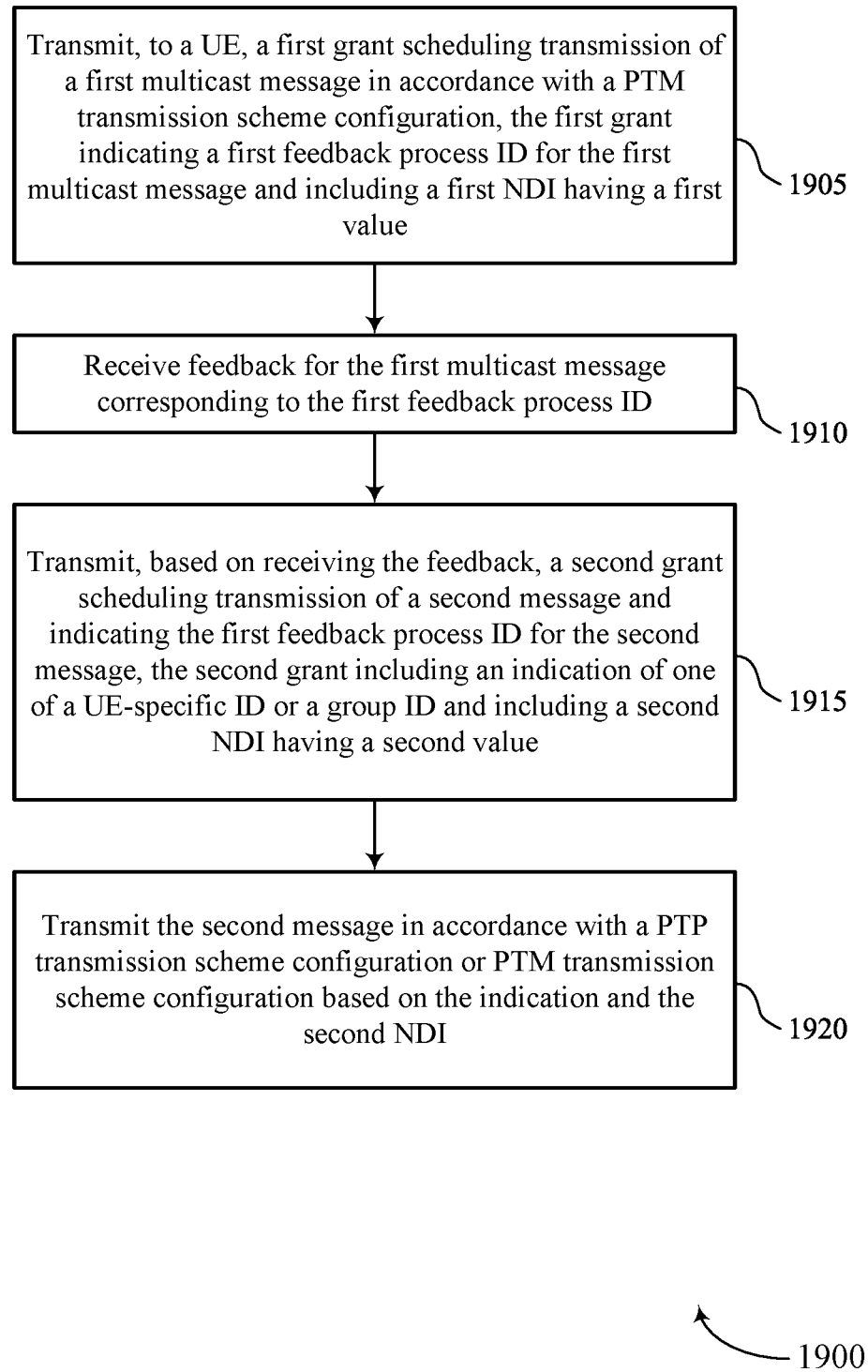

FIG. 19 shows a flowchart illustrating a method 1900 in accordance with aspects of the present disclosure. The operations of the method 1900 may be implemented by a base station or its components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, a first grant scheduling transmission of a first multicast message in accordance with a PTM transmission scheme configuration, the first grant indicating a first feedback process ID for the first multicast message and including a first NDI having a first value. The operations of 1905 may be performed in accordance with examples as disclosed herein. In some examples, aspects of the operations of 1905 may be performed by a grant transmission component 1430 as described with reference to FIG. 14.

At 1910, the method may include receiving feedback for the first multicast message corresponding to the first feedback process ID. The operations of 1910 may be performed in accordance with examples as disclosed herein. In some examples, aspects of the operations of 1910 may be performed by a feedback reception component 1440 as described with reference to FIG. 14.

At 1915, the method may include transmitting, based on receiving the feedback, a second grant scheduling transmission of a second message and indicating the first feedback process ID for the second message, the second grant including an indication of one of a UE-specific ID or a group ID and including a second NDI having a second value. The operations of 1915 may be performed in accordance with examples as disclosed herein. In some examples, aspects of the operations of 1915 may be performed by a grant transmission component 1430 as described with reference to FIG. 14.

At 1920, the method may include transmitting the second message in accordance with a PTP transmission scheme configuration or PTM transmission scheme configuration based on the indication and the second NDI. The operations of 1920 may be performed in accordance with examples as disclosed herein. In some examples, aspects of the operations of 1920 may be performed by a message transmission component 1435 as described with reference to FIG. 14.

The following provides an overview of aspects of the present disclosure:

Aspect 1: A method for wireless communication at a UE, comprising: receiving control signaling indicating a plurality of feedback process identifiers, wherein the plurality of feedback process identifiers comprises a first feedback process identifier reserved for multicast transmission; receiving a grant scheduling a retransmission of a multicast message and indicating a second feedback process identifier of the plurality of feedback process identifiers; and monitoring for the retransmission of the multicast message in accordance with a point to point transmission scheme configuration or a point to multipoint transmission scheme configuration based at least in part on the second feedback process identifier.

Aspect 2: The method of aspect 1, wherein the monitoring for the retransmission comprises: monitoring for the retransmission of the multicast message in accordance with the point to multipoint transmission scheme configuration based at least in part on the second feedback process identifier being the same as the first feedback process identifier.

Aspect 3: The method of any of aspects 1 through 2, wherein the monitoring for the retransmission comprises: monitoring for the retransmission of the multicast message in accordance with the point to point transmission scheme configuration based at least in part on the second feedback process identifier differing from the first feedback process identifier.

Aspect 4: The method of aspect 3, wherein the receiving the control signaling comprises: receiving radio resource control signaling indicating that the second feedback process identifier of the plurality of feedback process identifiers is useable for unicast transmission.

Aspect 5: The method of any of aspects 1 through 4, wherein the receiving the control signaling comprises: receiving radio resource control signaling indicating that the second feedback process identifier of the plurality of feedback process identifiers is useable for multicast transmission, unicast transmission, or both.

Aspect 6: The method of any of aspects 1 through 5, further comprising: receiving a second grant comprising the second feedback process identifier and scheduling transmission of a second multicast message, the second grant comprising a bit set scrambled with a group identifier and a new data indicator indicating that the second multicast message includes one of new data or previously transmitted data; and monitoring for the second multicast message using the point to multipoint transmission scheme configuration based at least in part on the second grant comprising the bit set scrambled with the group identifier.

Aspect 7: The method of any of aspects 1 through 6, further comprising: receiving a second grant comprising the second feedback process identifier and scheduling transmission of a second message, the second grant comprising a bit set scrambled with a UE-specific identifier and a new data indicator indicating that the second message includes one of new data or previously transmitted data; and monitoring for the second message using the point to point transmission scheme configuration based at least in part on the second grant comprising the bit set scrambled with the UE-specific identifier.

Aspect 8: The method of aspect 7, further comprising: receiving the second grant comprising a bit field; and monitoring for the second message that is a multicast retransmission based at least in part on the bit field.

Aspect 9: The method of any of aspects 7, further comprising: receiving the second grant comprising a bit field; and monitoring for the second message that is a unicast new transmission based at least in part on the new data indicator.

Aspect 10: The method of any of aspects 7, further comprising: receiving the second grant comprising a bit field; and monitoring for the second message that is a unicast retransmission based at least in part on the bit field.

Aspect 11: A method for wireless communication at a UE, comprising: receiving a first grant scheduling transmission of a first multicast message in accordance with a point to multipoint transmission scheme configuration, the first grant indicating a first feedback process identifier for the first multicast message and comprising a first new data indicator having a first value; transmitting feedback for the first multicast message corresponding to the first feedback process identifier; receiving, based at least in part on transmitting the feedback, a second grant scheduling transmission of a second message and indicating the first feedback process identifier for the second message, the second grant comprising an indication of one of a UE-specific identifier or a group identifier and comprising a second new data indicator having a second value; and monitoring for the second message in accordance with a point to point transmission scheme configuration or point to multipoint transmission scheme configuration based at least in part on the indication and the second new data indicator.

Aspect 12: The method of aspect 11, further comprising: receiving a third grant scheduling transmission of a third message and comprising a bit field scrambled by the group identifier; and monitoring for the third message that is a new transmission based at least in part on the second message being transmitted in accordance with the point to point transmission scheme configuration transmission scheme and the third grant comprising the bit field scrambled by the group identifier.

Aspect 13: The method of any of aspects 11 through 12, further comprising: receiving the second grant comprising a bit field scrambled by the UE-specific identifier; and monitoring for the second message that is a new transmission in accordance with the point to point transmission scheme configuration based at least in part on the bit field being scrambled with the UE-specific identifier and the second value being different than the first value.

Aspect 14: The method of aspect 13, further comprising: receiving a third grant scheduling transmission of a third message, the third grant comprising a bit field scrambled by the UE-specific identifier and a third new data indicator having the second value; and monitoring for the third message that is a retransmission of the second message in accordance with the point to point transmission scheme configuration based at least in part on the bit field being scrambled with the UE-specific identifier and the third new data indicator having the second value.

Aspect 15: The method of aspect 14, wherein the third grant comprises a cast indicator bit field, the monitoring for the third message further comprising: monitoring for the third message that is a retransmission of the second message based at least in part on the cast indicator bit field having a value indicating unicast.

Aspect 16: The method of any of aspects 11 through 15, further comprising: receiving the second grant comprising a bit field scrambled by the UE-specific identifier; and monitoring for the second message that is a retransmission of the first multicast message in accordance with the point to point transmission scheme configuration based at least in part on the bit field being scrambled with the UE-specific identifier and the second value being the same as the first value.

Aspect 17: The method of aspect 16, wherein the second grant comprises a cast indicator bit field, the monitoring for the second message further comprising: monitoring for the second message that is a retransmission of the first multicast message based at least in part on the cast indicator bit field having a value indicating multicast.

Aspect 18: The method of any of aspects 11 through 17, further comprising: receiving the second grant comprising a bit field scrambled by the group identifier; and monitoring for the second message that is a new transmission in accordance with the point to multipoint transmission scheme configuration based at least in part on the bit field being scrambled with the group identifier and the second value being different than the first value.

Aspect 19: The method of any of aspects 11 through 18, further comprising: receiving the second grant comprising a bit field scrambled by the group identifier; and monitoring for the second message that is a retransmission of the first multicast message in accordance with the point to multipoint transmission scheme configuration based at least in part on the bit field being scrambled with the group identifier and the second value being the same as the first value.

Aspect 20: A method for wireless communication at a base station, comprising: transmitting, to a UE, control signaling indicating a plurality of feedback process identifiers, wherein the plurality of feedback process identifiers comprises a first feedback process identifier reserved for multicast transmission; transmitting a grant scheduling a retransmission of a multicast message and indicating a second feedback process identifier of the plurality of feedback process identifiers; and transmitting a retransmission of the multicast message in accordance with a point to point transmission scheme configuration or a point to multipoint transmission scheme configuration based at least in part on the second feedback process identifier.

Aspect 21: The method of aspect 20, wherein the transmitting the retransmission of the multicast message comprises: transmitting the retransmission of the multicast message in accordance with the point to multipoint transmission scheme configuration based at least in part on the second feedback process identifier being the same as the first feedback process identifier.

Aspect 22: The method of any of aspects 20 through 21, wherein the transmitting the retransmission of the multicast message comprises: transmitting the retransmission of the multicast message in accordance with the point to point transmission scheme configuration based at least in part on the second feedback process identifier differing from the first feedback process identifier.

Aspect 23: The method of any of aspects 20 through 22, further comprising: transmitting a second grant comprising the second feedback process identifier and scheduling transmission of a second message, the second grant comprising a bit set scrambled with a UE-specific identifier, a new data indicator indicating that the second message includes previously transmitted data, and a bit field; and transmitting the second message that is a multicast retransmission based at least in part on the bit field.

Aspect 24: The method of any of aspects 20 through 23, further comprising: transmitting a second grant comprising the second feedback process identifier and scheduling transmission of a second message, the second grant comprising a bit set scrambled with a UE-specific identifier, a new data indicator indicating that the second message includes a new transmission, and a bit field; and transmitting the second message that is a new transmission based at least in part on the new data indicator.

Aspect 25: The method of any of aspects 20 through 24, further comprising: transmitting a second grant comprising the second feedback process identifier and scheduling transmission of a second message, the second grant comprising a bit set scrambled with a UE-specific identifier, a new data indicator indicating that the second message includes previously transmitted data, and a bit field; and transmitting the second message that is a unicast retransmission based at least in part on the bit field.

Aspect 26: A method for wireless communication at a base station, comprising: transmitting, to a UE, a first grant scheduling transmission of a first multicast message in accordance with a point to multipoint transmission scheme configuration, the first grant indicating a first feedback process identifier for the first multicast message and comprising a first new data indicator having a first value; receiving feedback for the first multicast message corresponding to the first feedback process identifier; transmitting, based at least in part on receiving the feedback, a second grant scheduling transmission of a second message and indicating the first feedback process identifier for the second message, the second grant comprising an indication of one of a UE-specific identifier or a group identifier and comprising a second new data indicator having a second value; and transmitting the second message in accordance with a point to point transmission scheme configuration or point to multipoint transmission scheme configuration based at least in part on the indication and the second new data indicator.

Aspect 27: The method of aspect 26, further comprising: transmitting a third grant scheduling transmission of a third message and comprising a bit field scrambled by the group identifier; and transmitting the third message that is a new transmission based at least in part on the second message being transmitted in accordance with the point to point transmission scheme configuration transmission scheme and the third grant comprising the bit field scrambled by the group identifier.

Aspect 28: The method of any of aspects 26 through 27, further comprising: transmitting the second grant comprising a bit field scrambled by the UE-specific identifier; and transmitting the second message that is a new transmission in accordance with the point to point transmission scheme configuration based at least in part on the bit field being scrambled with the UE-specific identifier and the second value being different than the first value.

Aspect 29: The method of aspect 28, further comprising: transmitting a third grant scheduling transmission of a third message, the third grant comprising a bit field scrambled by the UE-specific identifier, a third new data indicator having the second value, and a cast indicator bit field; and transmitting the third message that is a retransmission of the second message in accordance with the point to point transmission scheme configuration based at least in part on the bit field being scrambled with the UE-specific identifier, the third new data indicator having the second value, and the cast indicator bit field having a value indicating unicast.

Aspect 30: The method of any of aspects 26 through 29, further comprising: transmitting the second grant comprising a bit field scrambled by the UE-specific identifier and a cast indicator bit field; and transmitting the second message that is a retransmission of the first multicast message in accordance with the point to point transmission scheme configuration based at least in part on the bit field being scrambled with the UE-specific identifier, the second value being the same as the first value, and the cast indicator bit field having a value indicating multicast.

Aspect 31: An apparatus for wireless communication at a UE, comprising a processor; memory coupled with the processor; and instructions stored in the memory and executable by the processor to cause the apparatus to perform a method of any of aspects 1 through 10.

Aspect 32: An apparatus for wireless communication at a UE, comprising at least one means for performing a method of any of aspects 1 through 10.

Aspect 33: A non-transitory computer-readable medium storing code for wireless communication at a UE, the code comprising instructions executable by a processor to perform a method of any of aspects 1 through 10.

Aspect 34: An apparatus for wireless communication at a UE, comprising a processor; memory coupled with the processor; and instructions stored in the memory and executable by the processor to cause the apparatus to perform a method of any of aspects 11 through 19.

Aspect 35: An apparatus for wireless communication at a UE, comprising at least one means for performing a method of any of aspects 11 through 19.

Aspect 36: A non-transitory computer-readable medium storing code for wireless communication at a UE, the code comprising instructions executable by a processor to perform a method of any of aspects 11 through 19.

Aspect 37: An apparatus for wireless communication at a base station, comprising a processor; memory coupled with the processor; and instructions stored in the memory and executable by the processor to cause the apparatus to perform a method of any of aspects 20 through 25.

Aspect 38: An apparatus for wireless communication at a base station, comprising at least one means for performing a method of any of aspects 20 through 25.

Aspect 39: A non-transitory computer-readable medium storing code for wireless communication at a base station, the code comprising instructions executable by a processor to perform a method of any of aspects 20 through 25.

Aspect 40: An apparatus for wireless communication at a base station, comprising a processor; memory coupled with the processor; and instructions stored in the memory and executable by the processor to cause the apparatus to perform a method of any of aspects 26 through 30.

Aspect 41: An apparatus for wireless communication at a base station, comprising at least one means for performing a method of any of aspects 26 through 30.

Aspect 42: A non-transitory computer-readable medium storing code for wireless communication at a base station, the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling indicating a plurality of feedback process identifiers, wherein the plurality of feedback process identifiers comprises a first feedback process identifier reserved for multicast transmission;
   receiving a grant scheduling a retransmission of a multicast message and indicating a second feedback process identifier of the plurality of feedback process identifiers; and
   monitoring for the retransmission of the multicast message in accordance with a point to point transmission scheme configuration or a point to multipoint transmission scheme configuration based at least in part on the second feedback process identifier.

2. The method of claim 1, wherein the monitoring for the retransmission comprises:
   monitoring for the retransmission of the multicast message in accordance with the point to multipoint transmission scheme configuration based at least in part on the second feedback process identifier being the same as the first feedback process identifier.

3. The method of claim 1, wherein the monitoring for the retransmission comprises:
   monitoring for the retransmission of the multicast message in accordance with the point to point transmission scheme configuration based at least in part on the second feedback process identifier differing from the first feedback process identifier.

4. The method of claim 3, wherein the receiving the control signaling comprises:
   receiving radio resource control signaling indicating that the second feedback process identifier of the plurality of feedback process identifiers is useable for unicast transmission.

5. The method of claim 1, wherein the receiving the control signaling comprises:
   receiving radio resource control signaling indicating that the second feedback process identifier of the plurality of feedback process identifiers is useable for multicast transmission, unicast transmission, or both.

6. The method of claim 1, further comprising:
receiving a second grant comprising the second feedback process identifier and scheduling transmission of a second multicast message, the second grant comprising a bit set scrambled with a group identifier and a new data indicator indicating that the second multicast message includes one of new data or previously transmitted data; and
monitoring for the second multicast message using the point to multipoint transmission scheme configuration based at least in part on the second grant comprising the bit set scrambled with the group identifier.

7. The method of claim 1, further comprising:
receiving a second grant comprising the second feedback process identifier and scheduling transmission of a second message, the second grant comprising a bit set scrambled with a UE-specific identifier and a new data indicator indicating that the second message includes one of new data or previously transmitted data; and
monitoring for the second message using the point to point transmission scheme configuration based at least in part on the second grant comprising the bit set scrambled with the UE-specific identifier.

8. The method of claim 7, further comprising:
receiving the second grant comprising a bit field; and
monitoring for the second message that is a multicast retransmission based at least in part on the bit field.

9. The method of claim 7, further comprising:
receiving the second grant comprising a bit field; and
monitoring for the second message that is a unicast new transmission based at least in part on the new data indicator.

10. The method of claim 7, further comprising:
receiving the second grant comprising a bit field; and
monitoring for the second message that is a unicast retransmission based at least in part on the bit field.

11. A method for wireless communication at a user equipment (UE), comprising:
receiving a first grant scheduling transmission of a first multicast message in accordance with a point to multipoint transmission scheme configuration, the first grant indicating a first feedback process identifier for the first multicast message and comprising a first new data indicator having a first value;
transmitting feedback for the first multicast message corresponding to the first feedback process identifier;
receiving, based at least in part on transmitting the feedback, a second grant scheduling transmission of a second message and indicating the first feedback process identifier for the second message, the second grant comprising an indication of one of a UE-specific identifier or a group identifier and comprising a second new data indicator having a second value; and
monitoring for the second message in accordance with a point to point transmission scheme configuration or point to multipoint transmission scheme configuration based at least in part on the indication and the second new data indicator.

12. The method of claim 11, further comprising:
receiving a third grant scheduling transmission of a third message and comprising a bit field scrambled by the group identifier; and
monitoring for the third message that is a new transmission based at least in part on the second message being transmitted in accordance with the point to point transmission scheme configuration transmission scheme and the third grant comprising the bit field scrambled by the group identifier.

13. The method of claim 11, further comprising:
receiving the second grant comprising a bit field scrambled by the UE-specific identifier; and
monitoring for the second message that is a new transmission in accordance with the point to point transmission scheme configuration based at least in part on the bit field being scrambled with the UE-specific identifier and the second value being different than the first value.

14. The method of claim 13, further comprising:
receiving a third grant scheduling transmission of a third message, the third grant comprising a bit field scrambled by the UE-specific identifier and a third new data indicator having the second value; and
monitoring for the third message that is a retransmission of the second message in accordance with the point to point transmission scheme configuration based at least in part on the bit field being scrambled with the UE-specific identifier and the third new data indicator having the second value.

15. The method of claim 14, wherein the third grant comprises a cast indicator bit field, the monitoring for the third message further comprising:
monitoring for the third message that is a retransmission of the second message based at least in part on the cast indicator bit field having a value indicating unicast.

16. The method of claim 11, further comprising:
receiving the second grant comprising a bit field scrambled by the UE-specific identifier; and
monitoring for the second message that is a retransmission of the first multicast message in accordance with the point to point transmission scheme configuration based at least in part on the bit field being scrambled with the UE-specific identifier and the second value being the same as the first value.

17. The method of claim 16, wherein the second grant comprises a cast indicator bit field, the monitoring for the second message further comprising:
monitoring for the second message that is a retransmission of the first multicast message based at least in part on the cast indicator bit field having a value indicating multicast.

18. The method of claim 11, further comprising:
receiving the second grant comprising a bit field scrambled by the group identifier; and
monitoring for the second message that is a new transmission in accordance with the point to multipoint transmission scheme configuration based at least in part on the bit field being scrambled with the group identifier and the second value being different than the first value.

19. The method of claim 11, further comprising:
receiving the second grant comprising a bit field scrambled by the group identifier; and
monitoring for the second message that is a retransmission of the first multicast message in accordance with the point to multipoint transmission scheme configuration based at least in part on the bit field being scrambled with the group identifier and the second value being the same as the first value.

20. A method for wireless communication at a base station, comprising:
transmitting, to a user equipment (UE), control signaling indicating a plurality of feedback process identifiers, wherein the plurality of feedback process identifiers comprises a first feedback process identifier reserved for multicast transmission;

transmitting a grant scheduling a retransmission of a multicast message and indicating a second feedback process identifier of the plurality of feedback process identifiers; and transmitting a retransmission of the multicast message in accordance with a point to point transmission scheme configuration or a point to multipoint transmission scheme configuration based at least in part on the second feedback process identifier.

21. The method of claim 20, wherein the transmitting the retransmission of the multicast message comprises:

transmitting the retransmission of the multicast message in accordance with the point to multipoint transmission scheme configuration based at least in part on the second feedback process identifier being the same as the first feedback process identifier.

22. The method of claim 20, wherein the transmitting the retransmission of the multicast message comprises:

transmitting the retransmission of the multicast message in accordance with the point to point transmission scheme configuration based at least in part on the second feedback process identifier differing from the first feedback process identifier.

23. The method of claim 20, further comprising:

transmitting a second grant comprising the second feedback process identifier and scheduling transmission of a second message, the second grant comprising a bit set scrambled with a UE-specific identifier, a new data indicator indicating that the second message includes previously transmitted data, and a bit field; and transmitting the second message that is a multicast retransmission based at least in part on the bit field.

24. The method of claim 20, further comprising:

transmitting a second grant comprising the second feedback process identifier and scheduling transmission of a second message, the second grant comprising a bit set scrambled with a UE-specific identifier, a new data indicator indicating that the second message includes a new transmission, and a bit field; and transmitting the second message that is a new transmission based at least in part on the new data indicator.

25. The method of claim 20, further comprising:

transmitting a second grant comprising the second feedback process identifier and scheduling transmission of a second message, the second grant comprising a bit set scrambled with a UE-specific identifier, a new data indicator indicating that the second message includes previously transmitted data, and a bit field; and transmitting the second message that is a unicast retransmission based at least in part on the bit field.

26. A method for wireless communication at a base station, comprising:

transmitting, to a user equipment (UE), a first grant scheduling transmission of a first multicast message in accordance with a point to multipoint transmission scheme configuration, the first grant indicating a first feedback process identifier for the first multicast message and comprising a first new data indicator having a first value;

receiving feedback for the first multicast message corresponding to the first feedback process identifier;

transmitting, based at least in part on receiving the feedback, a second grant scheduling transmission of a second message and indicating the first feedback process identifier for the second message, the second grant comprising an indication of one of a UE-specific identifier or a group identifier and comprising a second new data indicator having a second value; and transmitting the second message in accordance with a point to point transmission scheme configuration or point to multipoint transmission scheme configuration based at least in part on the indication and the second new data indicator.

27. The method of claim 26, further comprising:

transmitting a third grant scheduling transmission of a third message and comprising a bit field scrambled by the group identifier; and transmitting the third message that is a new transmission based at least in part on the second message being transmitted in accordance with the point to point transmission scheme configuration transmission scheme and the third grant comprising the bit field scrambled by the group identifier.

28. The method of claim 26, further comprising:

transmitting the second grant comprising a bit field scrambled by the UE-specific identifier; and transmitting the second message that is a new transmission in accordance with the point to point transmission scheme configuration based at least in part on the bit field being scrambled with the UE-specific identifier and the second value being different than the first value.

29. The method of claim 28, further comprising:

transmitting a third grant scheduling transmission of a third message, the third grant comprising a bit field scrambled by the UE-specific identifier, a third new data indicator having the second value, and a cast indicator bit field; and transmitting the third message that is a retransmission of the second message in accordance with the point to point transmission scheme configuration based at least in part on the bit field being scrambled with the UE-specific identifier, the third new data indicator having the second value, and the cast indicator bit field having a value indicating unicast.

30. The method of claim 26, further comprising:

transmitting the second grant comprising a bit field scrambled by the UE-specific identifier and a cast indicator bit field; and transmitting the second message that is a retransmission of the first multicast message in accordance with the point to point transmission scheme configuration based at least in part on the bit field being scrambled with the UE-specific identifier, the second value being the same as the first value, and the cast indicator bit field having a value indicating multicast.

* * * * *